(12) United States Patent
Pizzochero et al.

(10) Patent No.: US 12,544,504 B2
(45) Date of Patent: Feb. 10, 2026

(54) VALVE SHAFT PUMP WITH COORDINATED PUMPING AND VALVING OPERATIONS

(71) Applicant: Becton, Dickinson and Company, Franklin Lakes, NJ (US)

(72) Inventors: Alessandro Pizzochero, Chelmsford, MA (US); Mark Wood, Sterling, MA (US); Shehryar Siddiqui, Hopkinton, MA (US); Elizabeth Gurin, Pawtucket, RI (US); Keith Knapp, Sudbury, VT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 813 days.

(21) Appl. No.: 17/795,863

(22) PCT Filed: Jan. 20, 2021

(86) PCT No.: PCT/US2021/014103
§ 371 (c)(1),
(2) Date: Jul. 27, 2022

(87) PCT Pub. No.: WO2021/154556
PCT Pub. Date: Aug. 5, 2021

(65) Prior Publication Data
US 2023/0064224 A1 Mar. 2, 2023

Related U.S. Application Data

(60) Provisional application No. 62/968,662, filed on Jan. 31, 2020.

(51) Int. Cl.
*A61M 5/142* (2006.01)
*A61M 5/145* (2006.01)
*F04B 9/04* (2006.01)

(52) U.S. Cl.
CPC .... *A61M 5/14216* (2013.01); *A61M 5/14248* (2013.01); *A61M 5/1452* (2013.01); *F04B 9/042* (2013.01); *A61M 2202/0486* (2013.01)

(58) Field of Classification Search
CPC .......... A61M 5/14216; A61M 5/14248; A61M 5/1452; A61M 2202/0486;
(Continued)

(56) References Cited

U.S. PATENT DOCUMENTS 3,565,298 A * 2/1971 Ohlin .................... F04B 7/0053
222/309
5,494,420 A 2/1996 Mawhirt et al.
(Continued)

OTHER PUBLICATIONS

International Search Report dated Apr. 1, 2021, which issued in the corresponding PCT Patent Application No. PCT/US2021/014103.

*Primary Examiner* — James D Ponton
(74) *Attorney, Agent, or Firm* — Dickinson Wright PLLC

(57) ABSTRACT

Pump subsystem for fluid delivery (e.g., in a wearable patch pump) comprises a fluid chamber with pumping motion and a valve shaft assembly with valving motion, both being driven by the same drive mechanism. Fluid chamber has variable volume chamber provided by a piston driven by the drive mechanism and translated relative to a plug in the pump housing. Piston extends the fluid chamber during an intake stroke and retracts the fluid chamber during a discharge stroke. Valve assembly has at least one valve shaft controllably translated by the drive mechanism to selectively align a first throughway with an opening in the pump chamber and a fluid intake port for an intake stroke to draw fluid into the fluid chamber, and align a second throughway with the opening in the pump chamber and a fluid discharge port for an discharge stroke to discharge fluid from the fluid chamber.

11 Claims, 23 Drawing Sheets

(58) Field of Classification Search
CPC ... A61M 5/14244; F04B 9/042; F04B 7/0015; F04B 7/0053; F04B 7/0057; F04B 9/047; F04B 13/00; F04B 23/02
See application file for complete search history.

(56) References Cited

U.S. PATENT DOCUMENTS

| | | |
|---|---|---|
| 2009/0196775 A1 | 8/2009 | Navarro |
| 2011/0206545 A1 | 8/2011 | Junod et al. |
| 2012/0101451 A1* | 4/2012 | Boit ............... A61M 39/223 417/490 |
| 2012/0215200 A1 | 8/2012 | Matsuura et al. |
| 2017/0184091 A1 | 6/2017 | Focht et al. |
| 2019/0365993 A1 | 12/2019 | Staub et al. |

* cited by examiner

VALVE SHAFT PUMP WITH COORDINATED PUMPING AND VALVING OPERATIONS

BACKGROUND

Field

Illustrative embodiments relate generally to pump subsystems for use in wearable medication infusion patches.

Description of Related Art

Diabetes is a group of diseases marked by high levels of blood glucose resulting from defects in insulin production, insulin action, or both. Diabetes can lead to serious health complications and premature death, but there are well-known products available for people with diabetes to help control the disease and lower the risk of complications.

Treatment options for people with diabetes include specialized diets, oral medications and/or insulin therapy. The primary goal for diabetes treatment is to control the patient's blood glucose (sugar) level in order to increase the chances of a complication-free life. It is not always easy, however, to achieve good diabetes management, while balancing other life demands and circumstances.

Currently, there are two principal modes of daily insulin therapy for the treatment of Type 1 diabetes. The first mode includes syringes and insulin pens that require a needle stick at each injection, typically three to four times per day. These devices are simple to use and relatively low in cost. Another widely adopted and effective method of treatment for managing diabetes is the use of an insulin pump. Insulin pumps can help users keep their blood glucose levels within target ranges based on their individual needs, by providing continuous infusion of insulin at varying rates to more closely mimic the behavior of the pancreas. By using an insulin pump, users can match their insulin therapy to their lifestyles, rather than matching their lifestyles to how an insulin injection is working for them.

However, conventional insulin pumps suffer from several drawbacks. For example, lead screw and piston type pump sub-systems typically used in insulin pumps are often cumbersome to users, requiring a large height and a large a footprint for a wearable insulin pump.

Conventional insulin pumps also typically require a large number of components and moving parts, thereby increasing risks of mechanical failure.

Conventional insulin pumps also typically have valves that are prone to leaking at elevated system back pressures. This can result in reduced dose accuracy and reliability.

Conventional insulin pumps also typically require large working volumes and large system volumes exposed to potentially high back pressure. This can result in reduced dose accuracy and reliability.

Conventional insulin pumps also typically have too long a tolerance loop for dose accuracy, depending on too many factors, which are sometimes difficult to ascertain. This can result in a reduced dose accuracy.

SUMMARY

The above and other problems are overcome, and additional advantages are realized, by illustrative embodiments in the present disclosure.

Another aspect of illustrative embodiments is to provide a pump sub-system with no direct fluid path between the reservoir and the cannula, compared to conventional pump sub-systems, thereby better safeguarding a user against overdose.

Another aspect of illustrative embodiments is to provide a pump sub-system with a small working volume and a low system volume exposed to potentially high back pressure, compared to conventional pump sub-systems, thereby increasing accuracy and reliability of pumps such as insulin patches.

In accordance with illustrative embodiments, a pump device for fluid delivery is provided comprising: a housing, a pump having a variable volume fluid chamber disposed within the housing and configured with a first end thereof that can be translated relative to a second end thereof to vary length of the fluid chamber along a longitudinal axis of the housing during pumping motion; a fluid intake port that is in fluid communication with a fluid supply for the fluid chamber; a fluid discharge port that is in fluid communication with a fluid path that receives fluid from the fluid chamber and directs the fluid to a fluid output; and a valve assembly movable relative to the fluid intake port and the fluid discharge port, the valve assembly comprising a first throughway and a second throughway. The housing has an opening from the fluid chamber to the valve assembly. The valve assembly is configured to be controllably translated and disposed between the opening and the fluid intake port to provide fluid communication therebetween via the first throughway for fluid intake into the fluid chamber, and between the opening and the fluid discharge port to provide fluid communication therebetween via the second throughway for fluid discharge from the fluid chamber, for during valving motion.

In accordance with aspects of the illustrative embodiments, the translation of the first end of the pump and the translation of the valve assembly are controlled to coordinate the valving motion of the valve assembly with the pumping motion of the pump.

In accordance with aspects of the illustrative embodiments, the housing and the pump have a first interlock mechanism that employs cam action to translate the first end of the pump relative to the second end when rotated by a drive mechanism, and the valve assembly has a second interlock mechanism that employs cam action to translate the valve assembly with respect to rotation of the drive mechanism.

In accordance with aspects of the illustrative embodiments, the pump comprises a plug and a piston disposed in the housing, a distal end of the plug and a proximal end of the piston respectively forming the second end and the first end of the pump. A proximal end of the piston is connected to the drive mechanism.

In accordance with aspects of the illustrative embodiments, the first interlock mechanism between the housing and the piston comprises an arcuate cam slot in one of the housing and the piston, and a pin on the other one of the housing and the piston that is configured to engage with the cam slot. When the piston is rotated, the cam slot is configured to control a distance by which the proximal end of the piston translates relative to the distal end of the plug and direction along the longitudinal axis for fluid intake and fluid discharge operations.

In accordance with aspects of the illustrative embodiments, the second interlock mechanism between the valve assembly and the drive mechanism comprises an arcuate cam slot in one of the valve assembly and the drive mechanism, and a pin on the other one of the valve assembly and the drive mechanism that is configured to engage with the cam slot. When the drive mechanism rotates, the cam slot is configured to control a distance by which the valve assembly translates along the longitudinal axis for fluid intake and fluid discharge operations.

In accordance with aspects of the illustrative embodiments, the valve assembly comprises at least one valve shaft comprising the first throughway and the second throughway and seals disposed along the at least one valve shaft on respective sides of the first throughway and the second throughway.

In accordance with aspects of the illustrative embodiments, the valve shaft is selectively translated along the longitudinal axis of the housing to align the opening of the housing, the first throughway of the value shaft, and the fluid intake port, and to seal the second throughway of the value shaft, during a fluid intake operation of the fluid delivery device, and to align the opening of the housing, the second throughway of the valve shaft, and the fluid discharge port, and to seal the first throughway of the value shaft, during a fluid discharge operation of the fluid delivery device.

In accordance with aspects of the illustrative embodiments, the plug and the piston are each provided with a seal for respective ones of the first end and the second end of the fluid chamber to prevent leakage except when fluid is received in the fluid chamber via the opening in the housing and when fluid is discharged from the fluid chamber via the opening in the housing.

In accordance with aspects of the illustrative embodiments, a pump member chosen from the plug and the piston is configured to have a shim coupled thereto to reduce volume of the pump chamber.

In accordance with aspects of the illustrative embodiments, volume of the pump chamber is reduced using at least one modification of the pump device selected from a reduction in the pump chamber diameter, and a reduction in a travel distance of the piston to vary the volume of the pump chamber.

In accordance with aspects of the illustrative embodiments, volume of the pump chamber is reduced by providing a boss on one of the piston and the plug, and a corresponding recess on other one of the piston and the plug.

Another aspect of illustrative embodiments of the present invention is to provide a metering system with a short tolerance loop for dose accuracy, which depends on few factors, compared to conventional metering pumps, thereby increasing dose accuracy. For example, in the illustrative embodiments, the tolerance loop for dose accuracy is short, and depends upon only one or two readily measurable dimensions such as a reduction in the pump chamber diameter, and a reduction in a travel distance of the piston to vary the volume of the pump chamber.

Additional and/or other aspects and advantages of illustrative embodiments will be set forth in the description that follows, or will be apparent from the description, or may be learned by practice of the illustrative embodiments. The illustrative embodiments may comprise apparatuses and methods for operating same having one or more of the above aspects, and/or one or more of the features and combinations thereof. The illustrative embodiments may comprise one or more of the features and/or combinations of the above aspects as recited, for example, in the attached claims.

BRIEF DESCRIPTION OF THE DRAWINGS

The above and/or other aspects and advantages of embodiments of the illustrative embodiments will be more readily appreciated from the following detailed description, taken in conjunction with the accompanying drawings, of which.

Throughout the drawing figures, like reference numbers will be understood to refer to like elements, features and structures.

DETAILED DESCRIPTION OF ILLUSTRATIVE EMBODIMENTS

Figure 1:
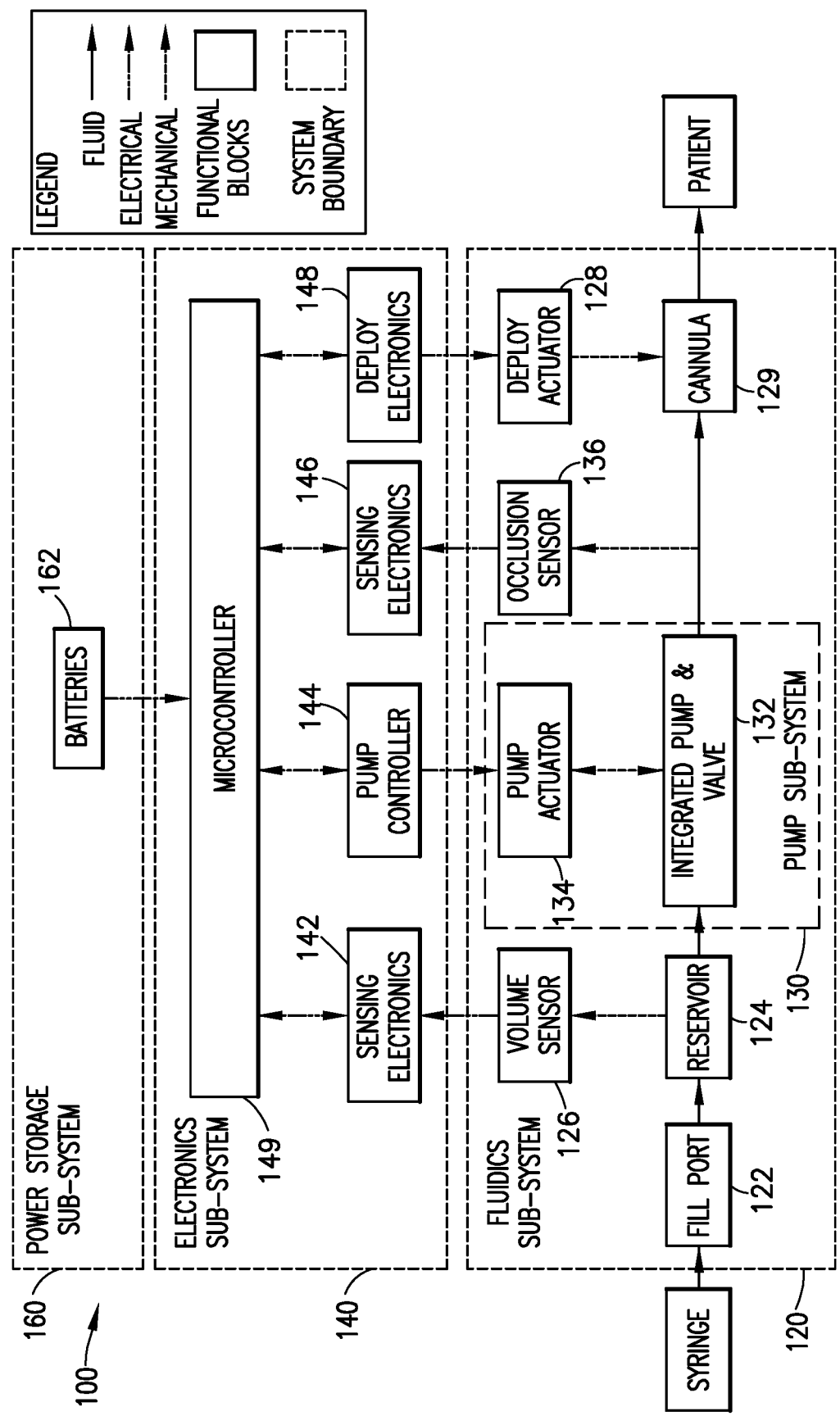
FIG. 1 shows a diagram of an architecture of an illustrative embodiment of a fluid pump such as a patch pump.

As will be appreciated by one skilled in the art, there are numerous ways of carrying out the examples, improvements, and arrangements of a pump in accordance with embodiments disclosed herein. Although reference will be made to the illustrative embodiments depicted in the drawings and the following descriptions, the embodiments disclosed herein are not meant to be exhaustive of the various alternative designs and embodiments that are encompassed by the disclosed technical solutions, and those skilled in the art will readily appreciate that various modifications may be made, and various combinations can be made with departing from the scope of the disclosed technical solutions.

Although various persons, including, but not limited to, a patient or a healthcare professional, can operate or use illustrative embodiments of the present disclosure, for brevity an operator or user will be referred to as a "user" hereinafter.

Although various fluids can be employed in illustrative embodiments of the present disclosure, for brevity the liquid in an injection device will be referred to as "fluid" hereinafter.

Illustrative embodiments are depicted in FIGS. 1 through 21. In an illustrative embodiment, a pump sub-system 130, 200 is provided for use in a wearable insulin infusion patch; however, as stated above, the wearable infusion patch can be used to deliver other types of fluids such as a medicament other than insulin. For example, in illustrative embodiments of the present disclosure, the pump sub-system 130, 200 is part of a larger fluidics sub-system 100 that includes a reservoir for storing insulin and a cannula assembly for delivering the insulin into sub-cutaneous tissue. The pump sub-system 200 draws a small dose of fluid from the reservoir and then pushes it down the cannula line and into the patient. The fluid dose is small relative to the reservoir volume, such that many pump strokes are required to completely empty the reservoir.

FIG. 1 shows a diagram of an architecture of a patch-type pump 100 in accordance with an exemplary embodiment of the present disclosure. The pump 100 includes a fluidics sub-system 120, an electronics sub-system 140 and a power storage sub-system 160.

The fluidics sub-system 120 includes a fill port 122 in fluid communication with a reservoir 124. The reservoir 124 is adapted to receive fluid from a syringe, through the fill port.

The fluidics sub-system 120 further includes an optional volume sensor 126 coupled to the reservoir 124. The volume sensor 126 is adapted to detect or determine the fluidic volume of the reservoir.

The fluidics sub-system 120 further includes an example pump sub-system 130, which includes an integrated pump and valve system 132 mechanically coupled to a pump actuator 134. Examples of pump sub-systems are described in commonly-owned WO 2015/157174, which is incorporated by reference herein. The integrated pump and valve system 132 is in fluid communication with the reservoir 124 of the fluidics sub-system 120, and is actuated by the pump actuator 134.

The fluidics sub-system 120 further includes a cannula mechanism having a deployment actuator 128 mechanically coupled to a cannula 129. The deployment actuator 128 is adapted to insert the cannula 129 into a user. The cannula 129 is in fluid communication with the integrated pump and valve system 132 of the pump sub-system 130.

The fluidics sub-system 120 further includes an optional occlusion sensor 136 coupled to a fluid pathway between the cannula 129 and the integrated pump and valve system 132. The occlusion sensor 136 is adapted to detect or determine an occlusion in the pathway between the cannula 129 and the integrated pump and valve system 132.

The electronics sub-system 140 includes optional volume sensing electronics 142 electrically coupled to the volume sensor 126 of the fluidics sub-system 120, a pump controller 144 electrically coupled to the pump actuator 134 of the pump sub-system 130, optional occlusion sensing electronics 146 electrically coupled to the occlusion sensor 136 of the fluidics sub-system 120, and optional deployment electronics 148 electrically coupled to the cannula 129 of the fluidics sub-system (e.g., the cannula deployment actuator 128 can be manual). The electronics sub-system 140 further includes a microcontroller 149 electrically coupled to the volume sensing electronics 142, the pump controller 144, the occlusion sensing electronics 146, and the deployment electronics 148.

The power storage sub-system 160 includes batteries 162 or any other electrical power source known in the art. The batteries 162 can be adapted to power any element or electronic component of the patch pump 100.

In accordance with an illustrative embodiment, the integrated pump and valve system 132 is provided as an example pump sub-system 200 wherein pumping and valving motions are coordinated with the same drive mechanism (e.g., output gear 246 connected to a drive actuator 134), as described below in connection with FIGS. 2-21. For example, the output of the drive mechanism drives, in one embodiment, the rotation of a piston 208 in the pump sub-system 200 through an adapter or output gear 246. The adapter or output gear 246 has a pin 250 that drives a valve assembly 232 back and forth by riding in a helical cam slot 256 (e.g., provided in a shuttle 254). The shape of the cam slot 256 determines the mechanical movement (e.g., timing) of the position of valve shafts 234, 240 secured to the valve assembly 232. The valve shafts 234, 240 are fitted with elastomeric seals and two throughways 238, 244. The two throughways 238, 244 are designed to overlap on one side of the shafts 234, 240 with a single opening 224 connected to the piston pumping chamber 214. The two throughways 238, 244 are designed on the other side of the shafts 234, 240 to be controllably aligned with corresponding ones of two ports. One of the two ports 228, 230 is connected to the reservoir, and the other one of the two ports is connected to the patient side. The valve shafts can therefore be moved back and forth, connecting the fluid chamber 214 to either a reservoir or to the patient side. As the output gear 246 drives the valve shafts 234, 240, the output gear 246 is also engaged with mating features on the piston 208. A cam track or slot 218, similar in function to the slot 256 on the valve assembly shuttle 254, is provided in the pump housing 202 and is used to drive the piston 208 back and forth as the piston is being rotated by the output gear 246. The piston 208 has mating features that are long enough to ensure full engagement with the output gear 246. It is also possible to have an intermediate adapter that engages the valve assembly 232 and/or the piston 208 in order to avoid making changes to existing gearboxes. Piston 208 movement is therefore coordinated with that of the valve shaft(s) 234, 240 of the valve assembly in accordance with the illustrative embodiment.

Reference is now made to FIGS. 2, 3, 4, 5, 6 and 7 which are perspective views of the pump sub-system 200 with the pump housing 202 in phantom to show an interlock mechanism comprising the piston pin 216 and the cam slot 218. The pump housing 202 is generally configured as a tubular member with an outer wall forming a cylindrical or tubular shape defining an interior dimensioned to receive the piston 208 and a plug 206 therein. It is to be understood that the pump housing can be a shape other than a cylinder and that the shape and the exterior circumference and interior diameter can vary along the longitudinal axis of the pump housing.

The plug 206 is provided in a proximal end of the housing 202 and the piston 208 is provided in a distal end of the housing 202. A fluid chamber 214 is defined between a distal end of the plug 206 and a proximal end of the piston 208. As stated above, a distal end of the piston 208 is coupled to the output gear 246 and rotated by the output gear 246. The output gear 246 is controllably rotated by a pump actuator 134 such as a motor and/or gearbox. An example of a gearbox is described in commonly-owned WO 2015/157174. As described in more detail below, the housing 202 and the piston 208 are coupled by the interlock mechanism comprising a pin 216 and cam slot 218 arrangement that is configured to controllably translate the piston 208 back and forth along the longitudinal axis of the housing 202 and relative to the plug 206 to receive fluid within the fluid chamber 214 via a fluid intake port 228 during an intake pumping motion or stroke during a pump cycle) and to expel fluid from the fluid chamber 214 (e.g., via a fluid discharge port 230 during a discharge pumping motion or stroke during a pump cycle). Thus, the volume of the fluid chamber 214 is variable depending on the displacement of the piston 208 by the output gear 246 and the interlock mechanism comprising the pin 216 and the cam slot 218. For example, the pin 216 can be provided on the piston 208 and follow a helical cam slot 218 provided in the pump housing 202, as shown in FIGS. 2 through 7. For example, the piston 208 can be provided with an aperture to receive the pin 216 which can be press fit, glued, molded or otherwise fastened to the aperture, or otherwise molded to the piston 208 without need for an aperture therein. Alternatively, the pin 216 can be provided on the housing 202 to follow a helical cam slot on the piston 208.

Figure 2:
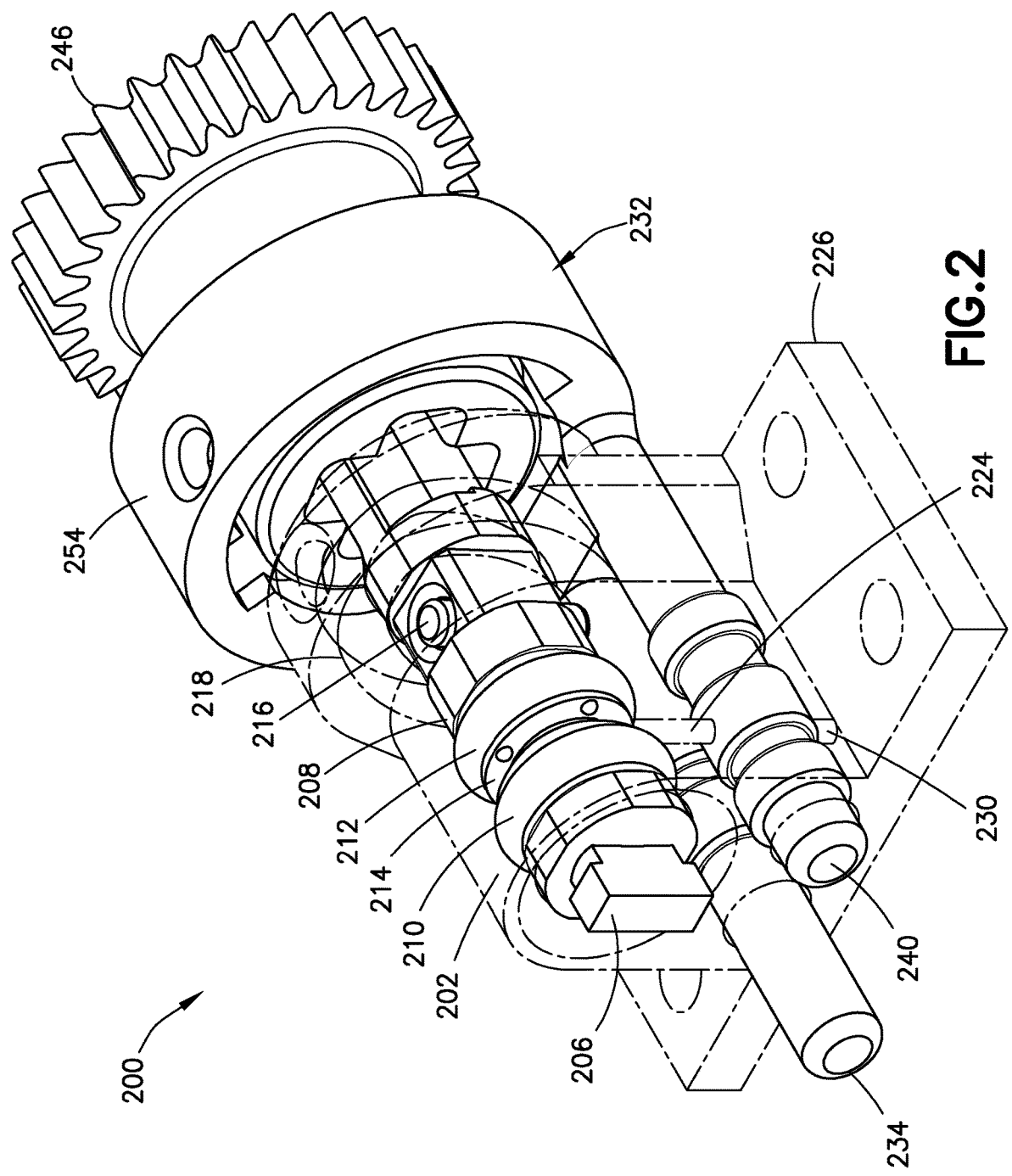
FIGS. 2, 3, 4, 5, 6 and 7 are perspective views of a pump sub-system in accordance with an illustrative embodiment and showing pump housing components in phantom.
Figure 3:
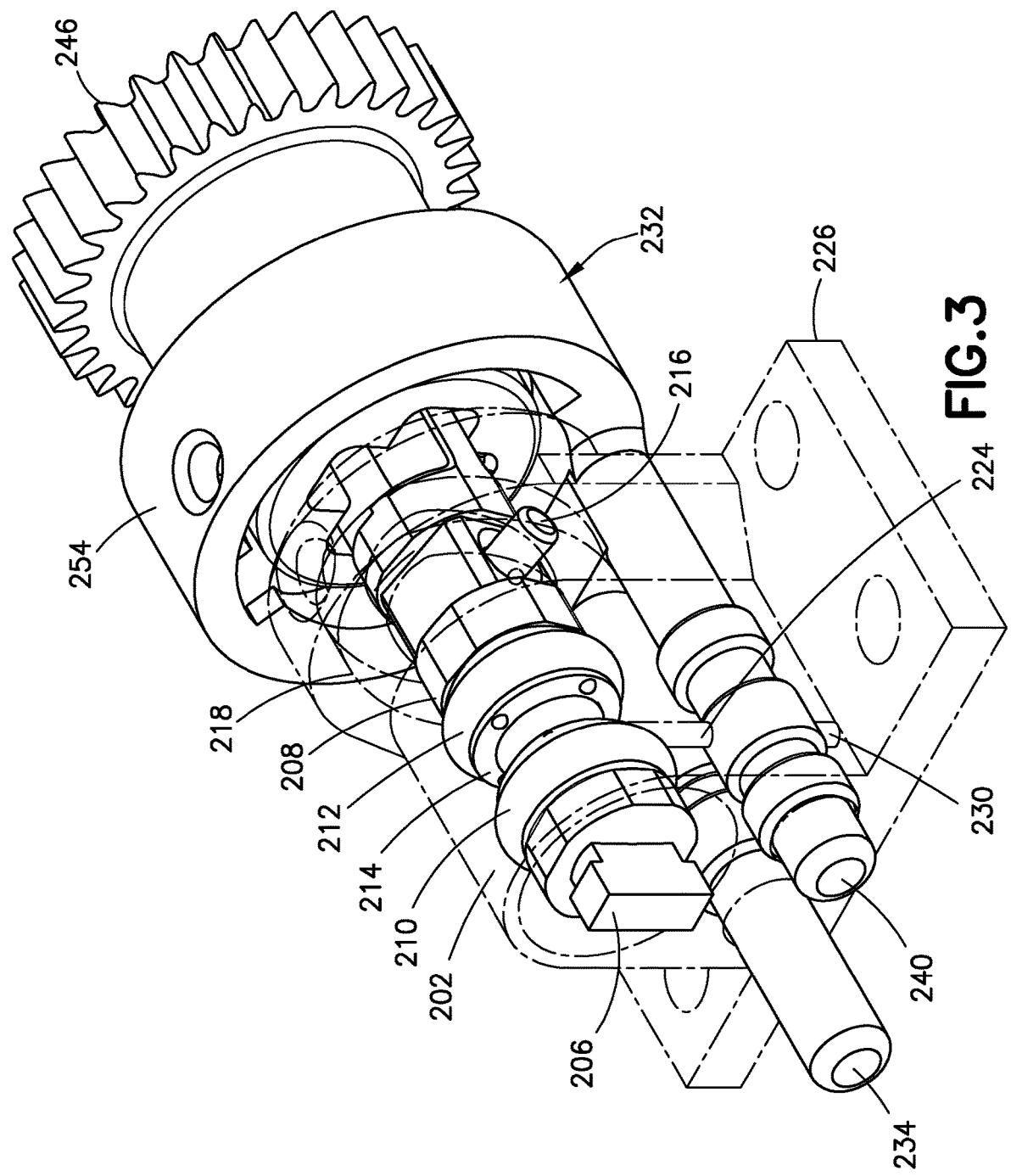
Figure 4:
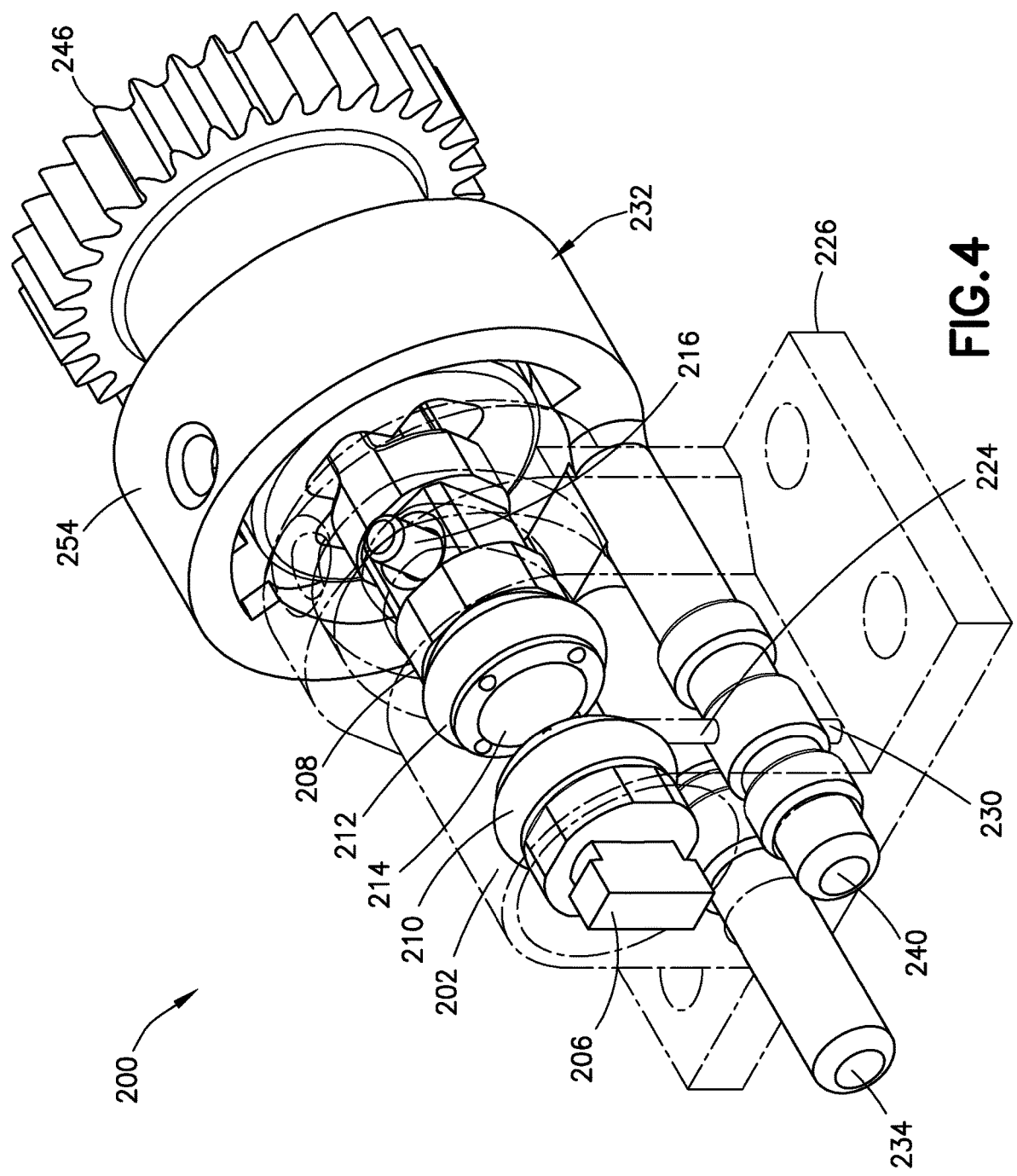
Figure 5:
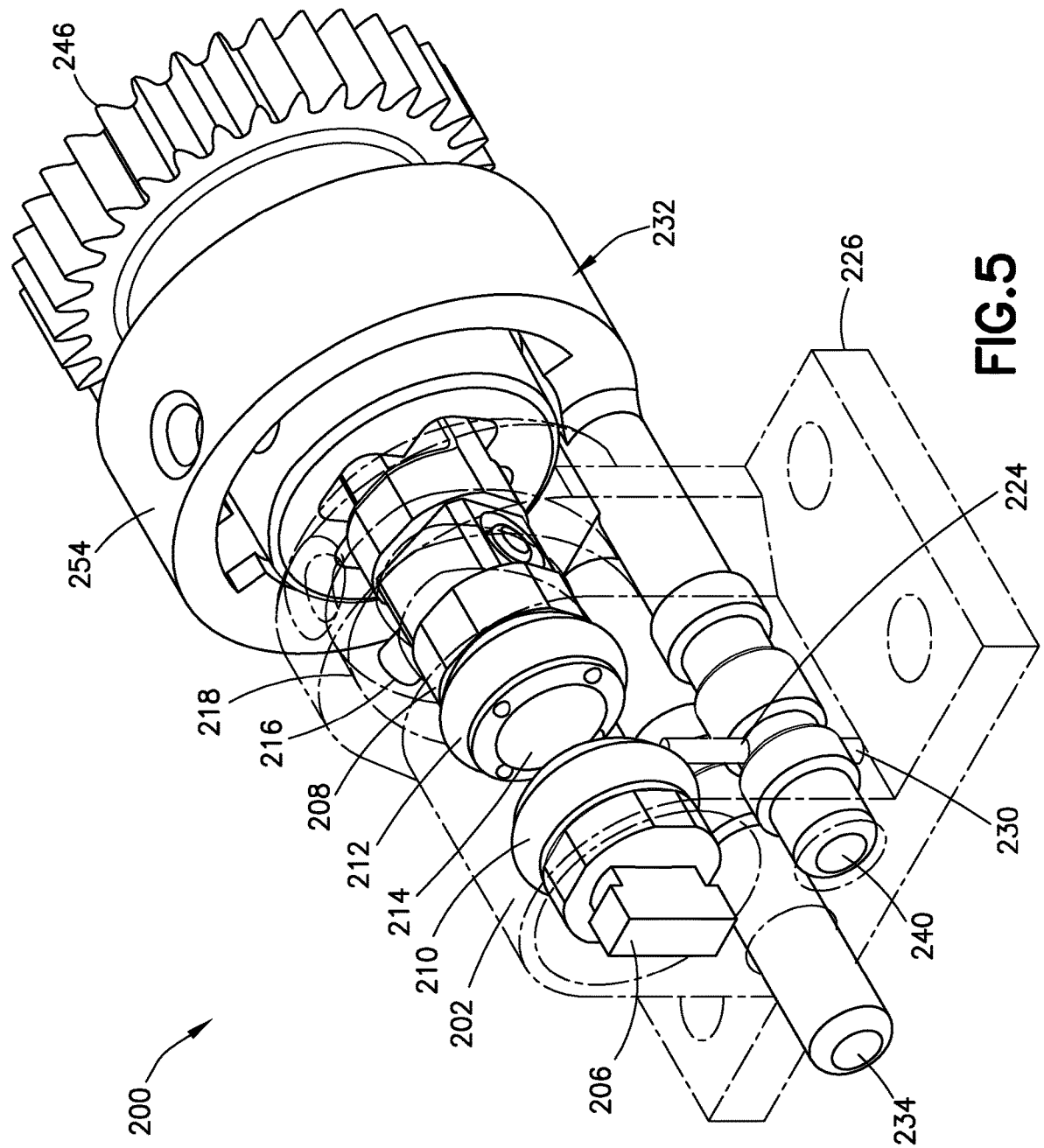
Figure 6:
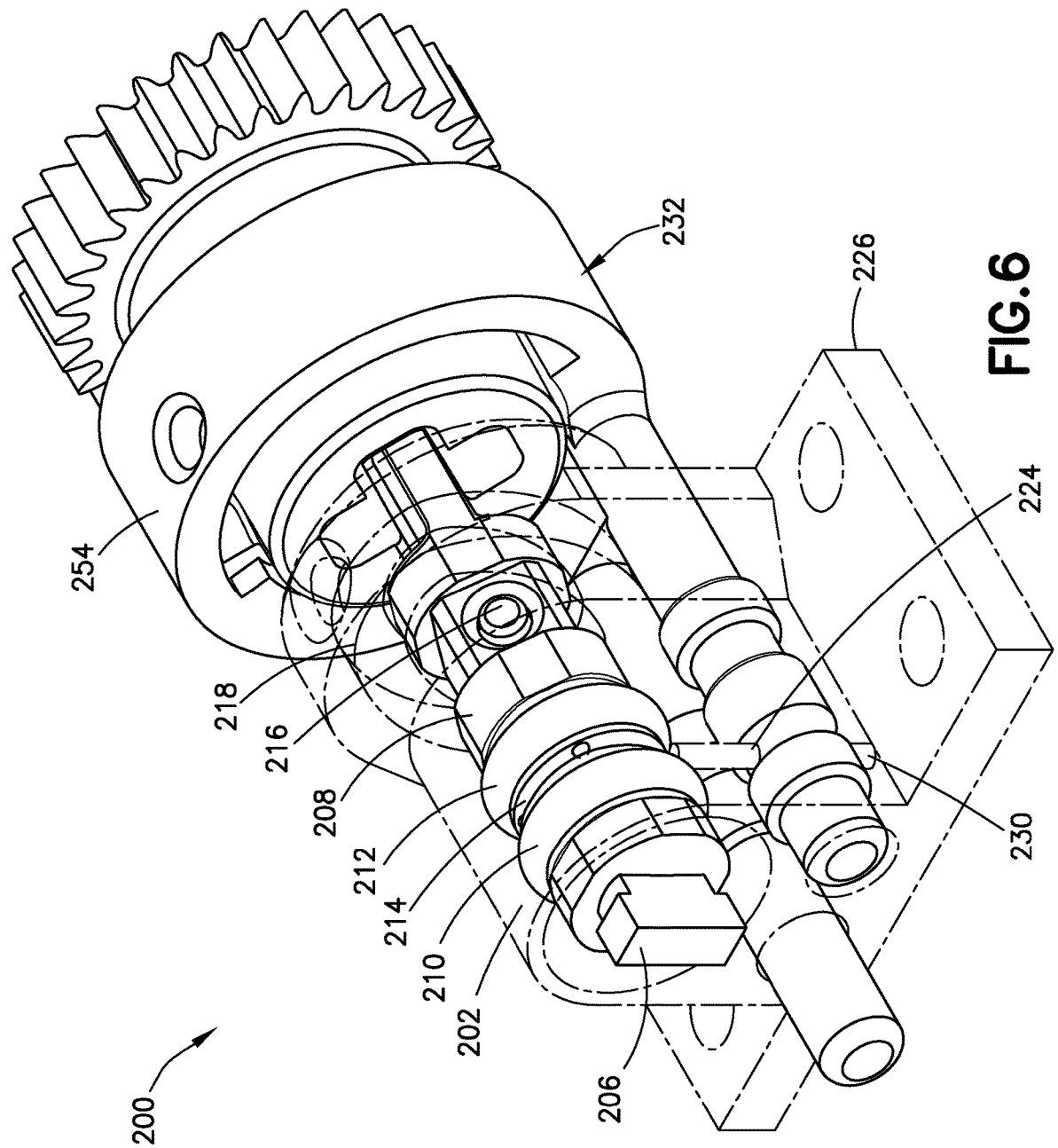
Figure 7:
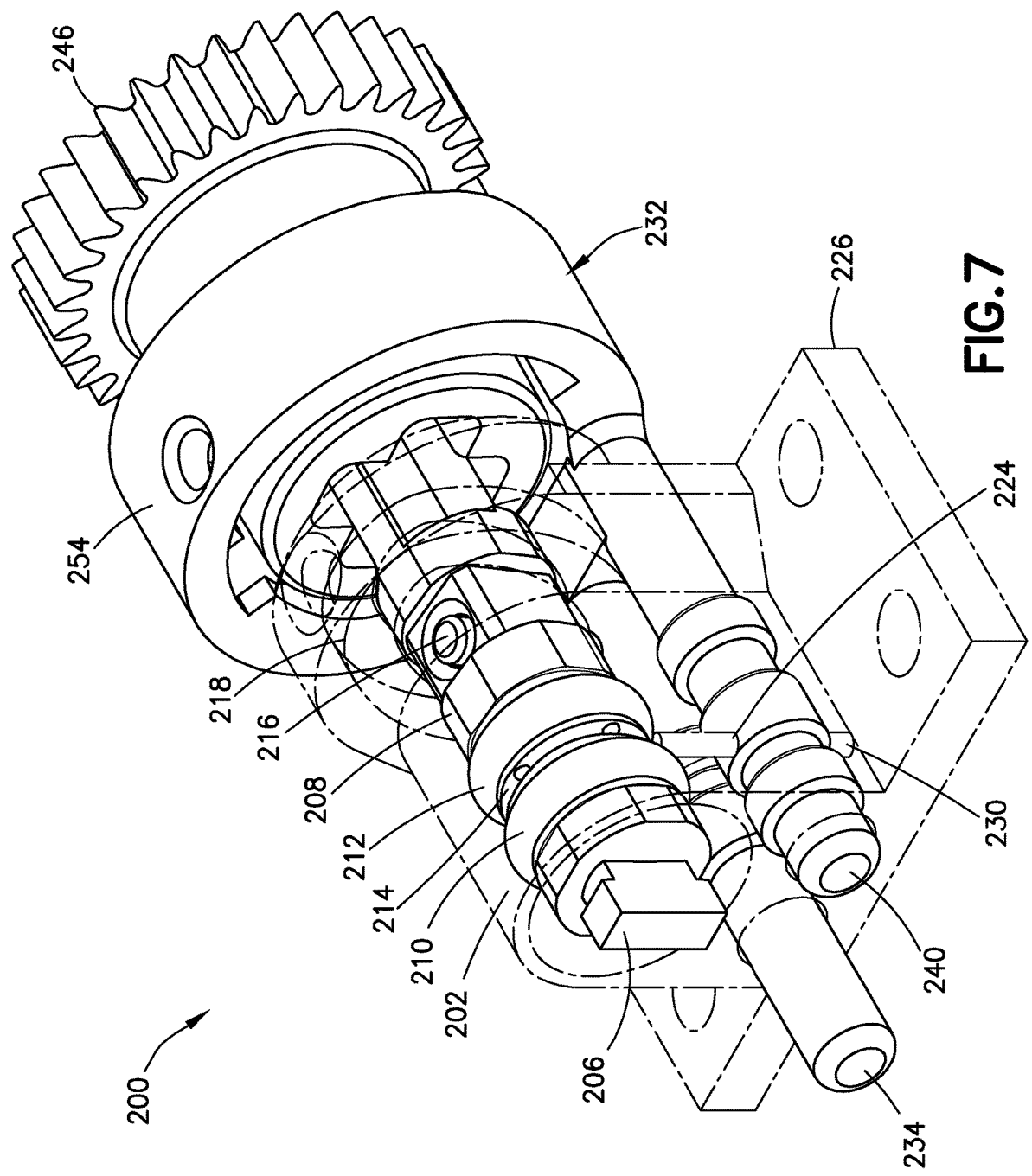

The piston 208 and plug 206 are each provided with seals 212 and 210, respectively, on respective ends of the fluid chamber 214. The piston 208 is translated by a gearbox or other drive mechanism 134 to extend the fluid chamber 214 during an intake stroke, as illustrated in FIGS. 2, 3 and 4, and to retract the fluid chamber 214 during a discharge stroke, as illustrated in FIGS. 5, 6 and 7. The distance the piston translates during a stroke is mechanically controlled by the degree of curve and length of the cam slot 218. The seals (e.g., O-rings) are configured to prevent leakage of reservoir fluid from the fluid chamber 214. The seals 212 and 210 also stabilize the piston 208 and plug 206 in the pump housing (e.g., during rotation by the output gear 246), and the seal 212 also stabilizes and centers the position of the piston 208 during its translation along the longitudinal axis of the housing 202.

Figure 23:
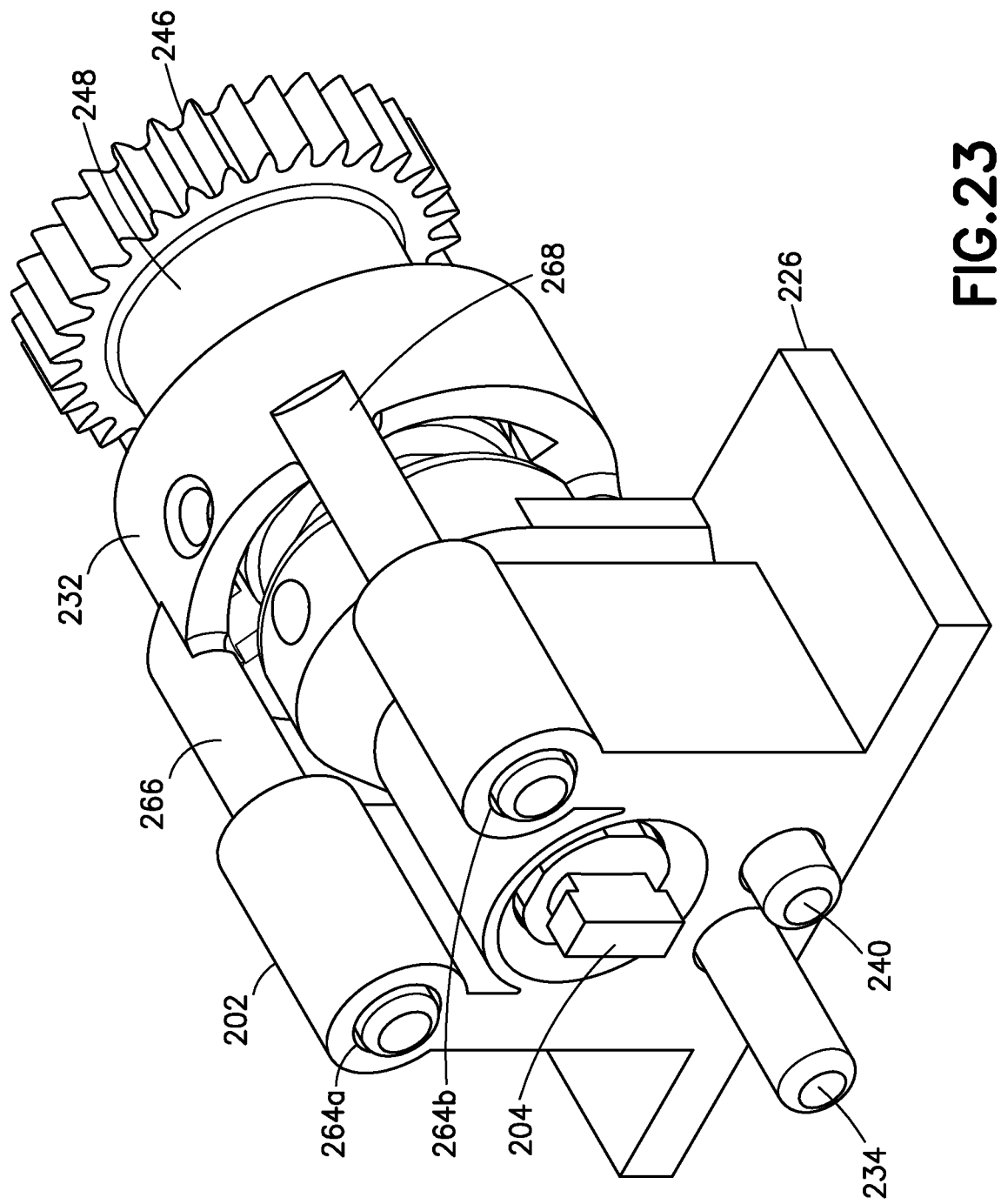
FIG. 23 is a perspective view of perspective views of a pump sub-system in accordance with another illustrative embodiment.

As shown in FIGS. 2-7, the pump housing 202 is mounted on a baseplate 226. The base plate 226 is formed with the fluid intake port 228 that extends through the base plate for fluid connection from the pump housing to the reservoir 124 via a fluid pathway (not shown) in the patch pump 100. The base plate is also formed with fluid discharge port 230 that extends through the base plate for fluid connection from the pump housing to the cannula 129 via a fluid pathway (not shown) in the patch pump 100. These ports 228, 230 in the base plate 226 are controllably exposed to the fluid chamber 214 by select positioning of O-rings or seals 236a,b and 242a,b,c (shown in FIGS. 16-21) on the valve assembly 232 and translation with their respective valve shafts 234, 240 along the longitudinal axis of the pump sub-system 200, and sizing of the cam slot 256 in a second interlock mechanism involving output gear pin 250 to move throughways 238,244 in the valve shafts 234, 240 the necessary distances to align with respective ones of the corresponding ports 228,230 and the opening 224 in the pump housing 202 and fluid chamber 214, depending the current point in a pump cycle. The valve assembly can also be provided with one or more shafts that slidably engage the pump housing 202 toward the top thereof to counterbalance any potential tilting of the valve assembly 232 backwards while pushing the valve shafts 234, 240. For example, in the illustrative embodiment shown in FIG. 23, the housing 202 can be further provided with bore holes 264a and 264b that slidably receive respective ones of valve shafts 266,268 provided on the valve assembly 232.

The base plate 226 and housing 202 can be an integral unit, or a separate molded housing 202 is mounted on the base plate 226. The housing 202 has a bore hole 204 (shown in FIG. 8) defining an interior that receives the plug 206 and piston 208, and supports the fluid chamber 214, and has the opening 224. The housing 202 can also have bore holes 222a and 222b (shown in FIG. 8) that slidably receive respective ones of the valve shafts 234,240 provided on the valve assembly 232.

Operation of the pump sub-system 200 during a full pump cycle comprising a discharge stroke and intake stroke is described herein with reference to FIGS. 8 through 21 in accordance with an illustrative embodiment. FIGS. 8, 9, 10, 11, 12, 13, 14 and 15 are perspective views of the pump sub-system 200 in accordance with an illustrative embodiment and showing the valve assembly 232 components in phantom at different points in time during a pump cycle. FIGS. 16, 17, 18, 19, 20, and 21 are bottom views of the pump sub-system 200 at different points in time during a pump cycle and in accordance with an illustrative embodiment.

Figure 8:
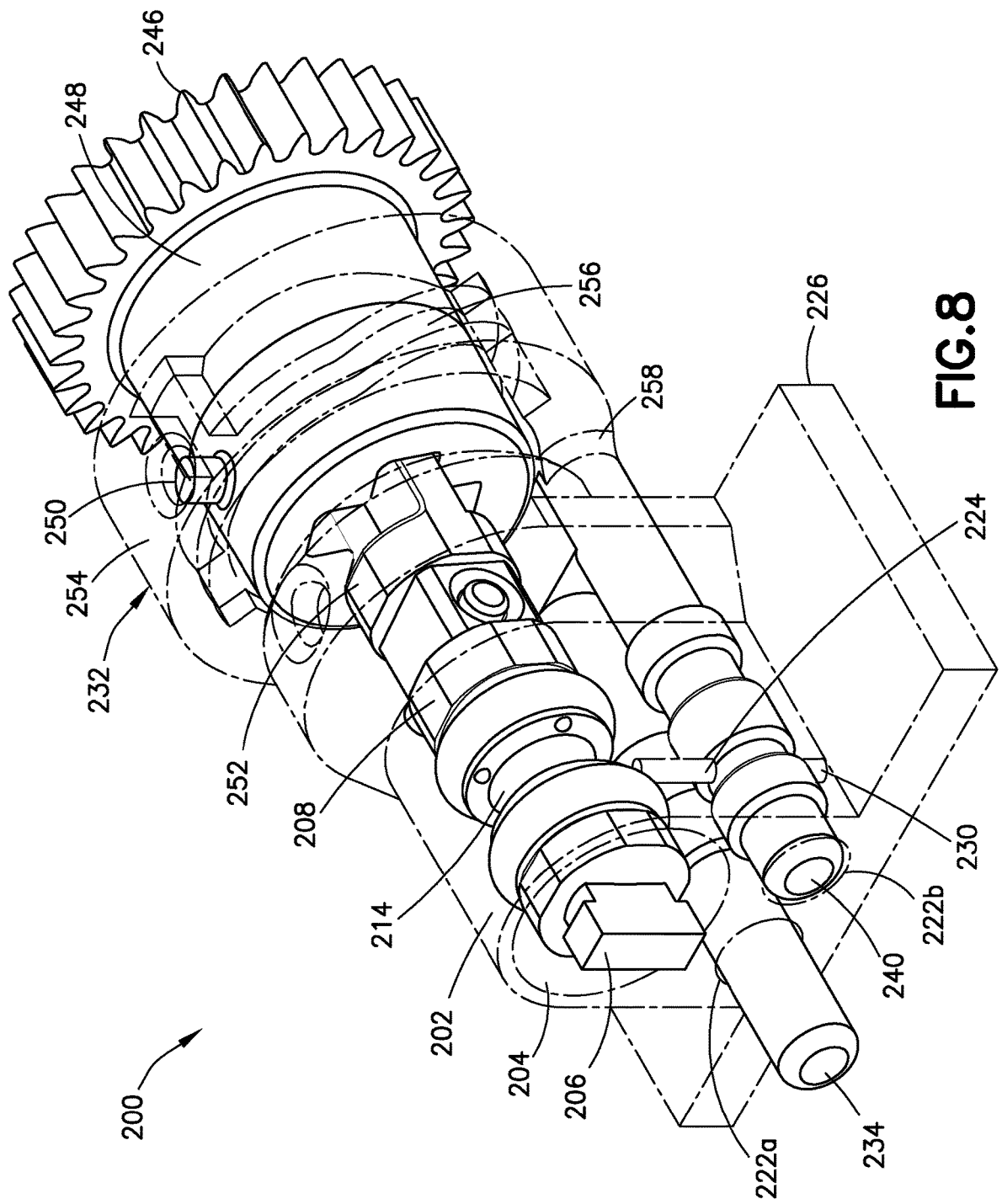
FIGS. 8, 9, 10, 11, 12, 13, 14 and 15 are perspective views of a pump sub-system in accordance with an illustrative embodiment and showing valve assembly components in phantom.
Figure 9:
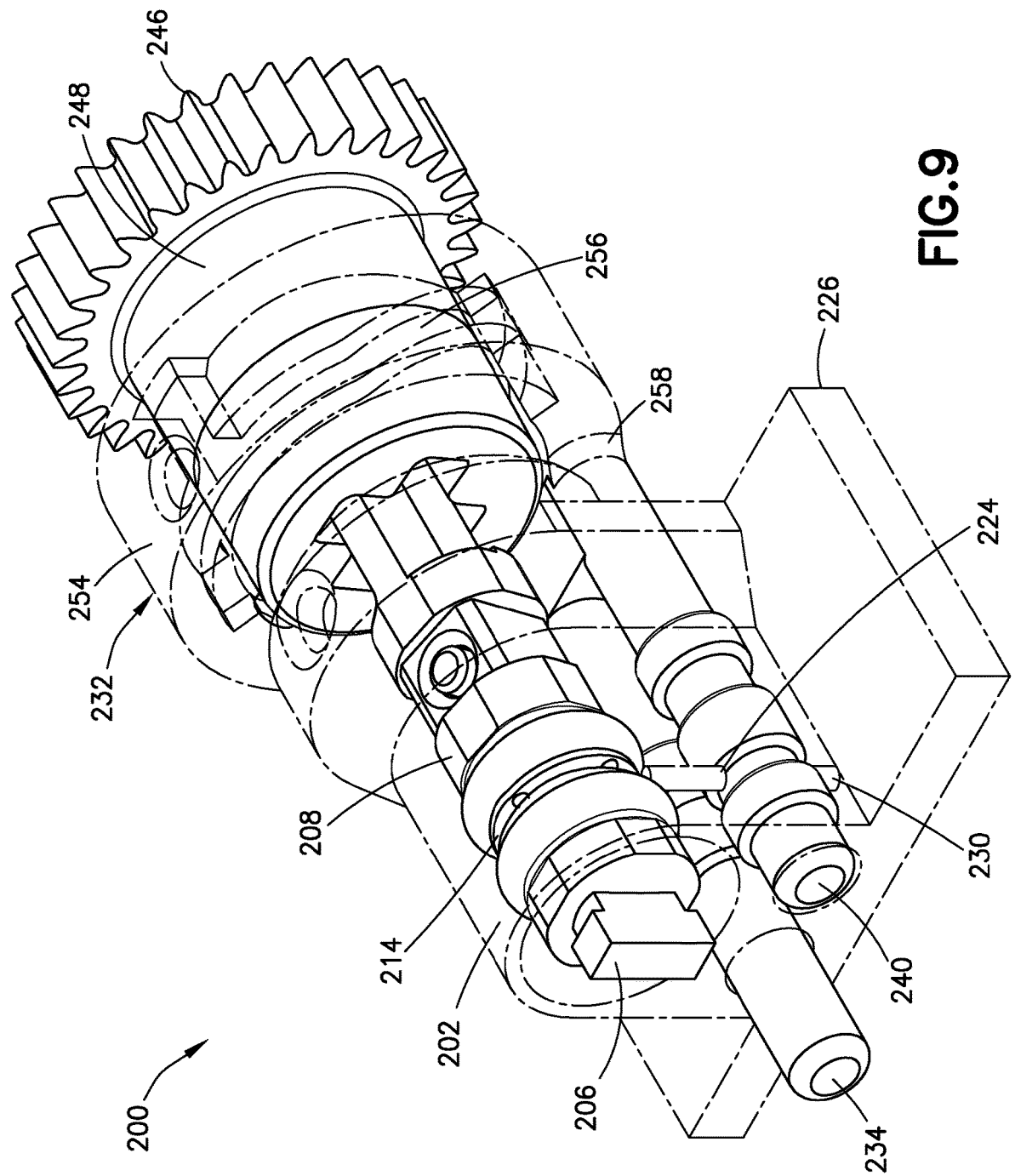
Figure 16:
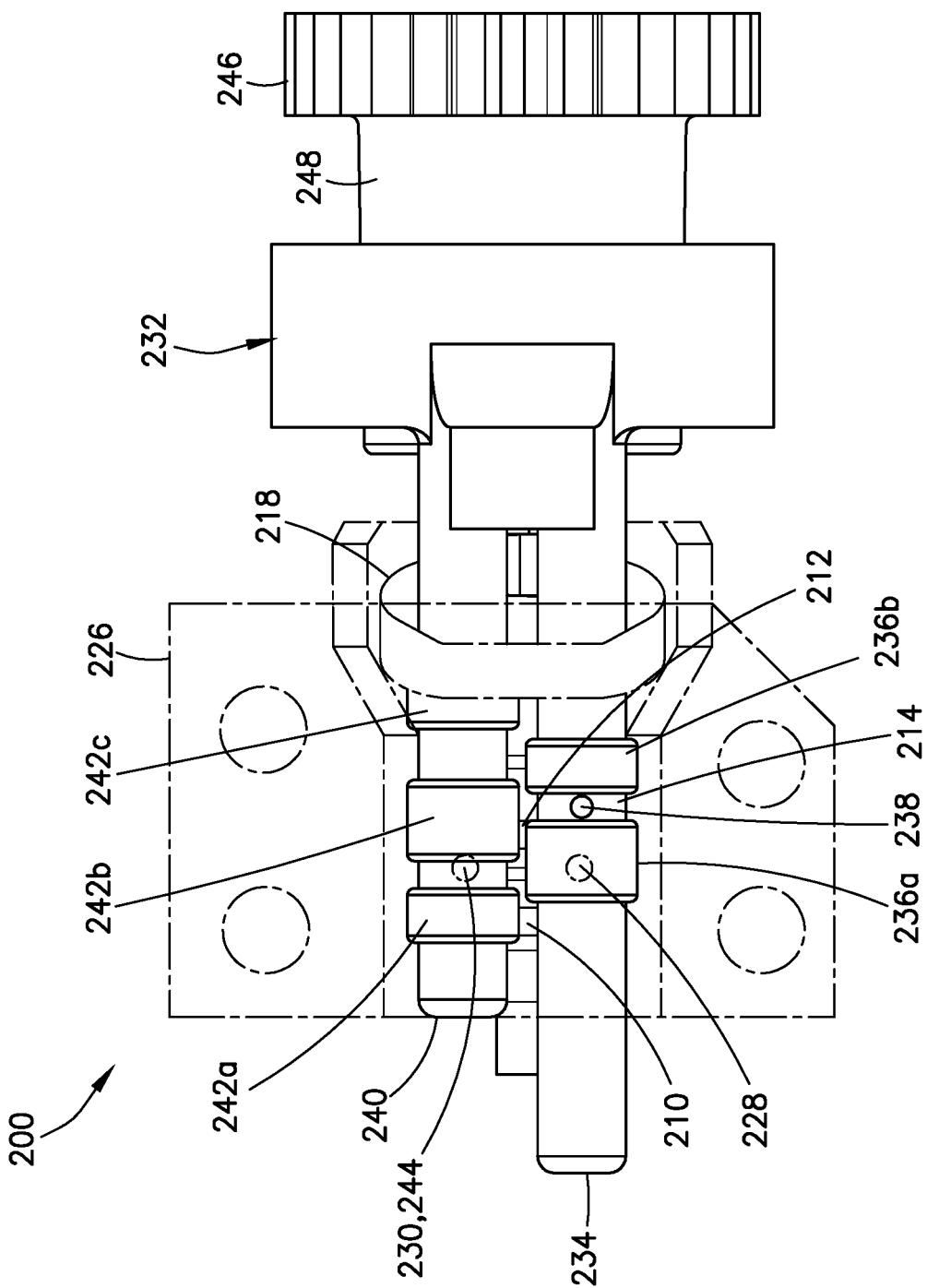
FIGS. 16, 17, 18, 19, 20, and 21 are bottom views of a pump sub-system in accordance with an illustrative embodiment.

As shown in FIGS. 8 and 16, the valve shafts 234,240 are retracted, the opening 224 in the housing 202 is aligned with a throughway 244 of the valve shaft 240, which is aligned with the fluid discharge port 230 in the base plate 226. As shown in FIG. 9, the valve shafts 234,240 are not translated, but the piston 208 is translating toward the plug 206 to retract and shorten the length of the fluid chamber 214 and push fluid out of the chamber and toward the patient via the throughway 244 and fluid discharge port 30.

Figure 10:
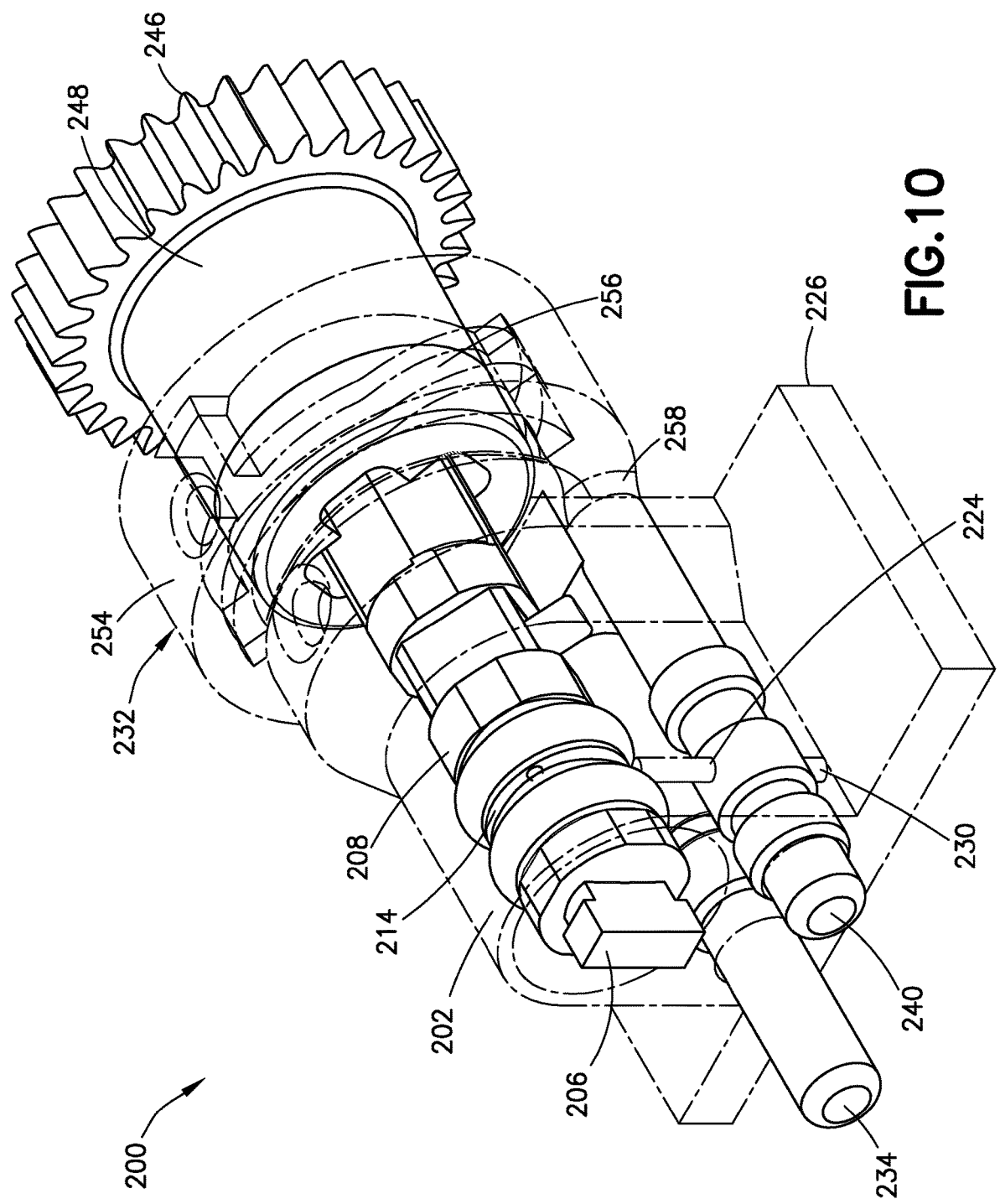
Figure 17:
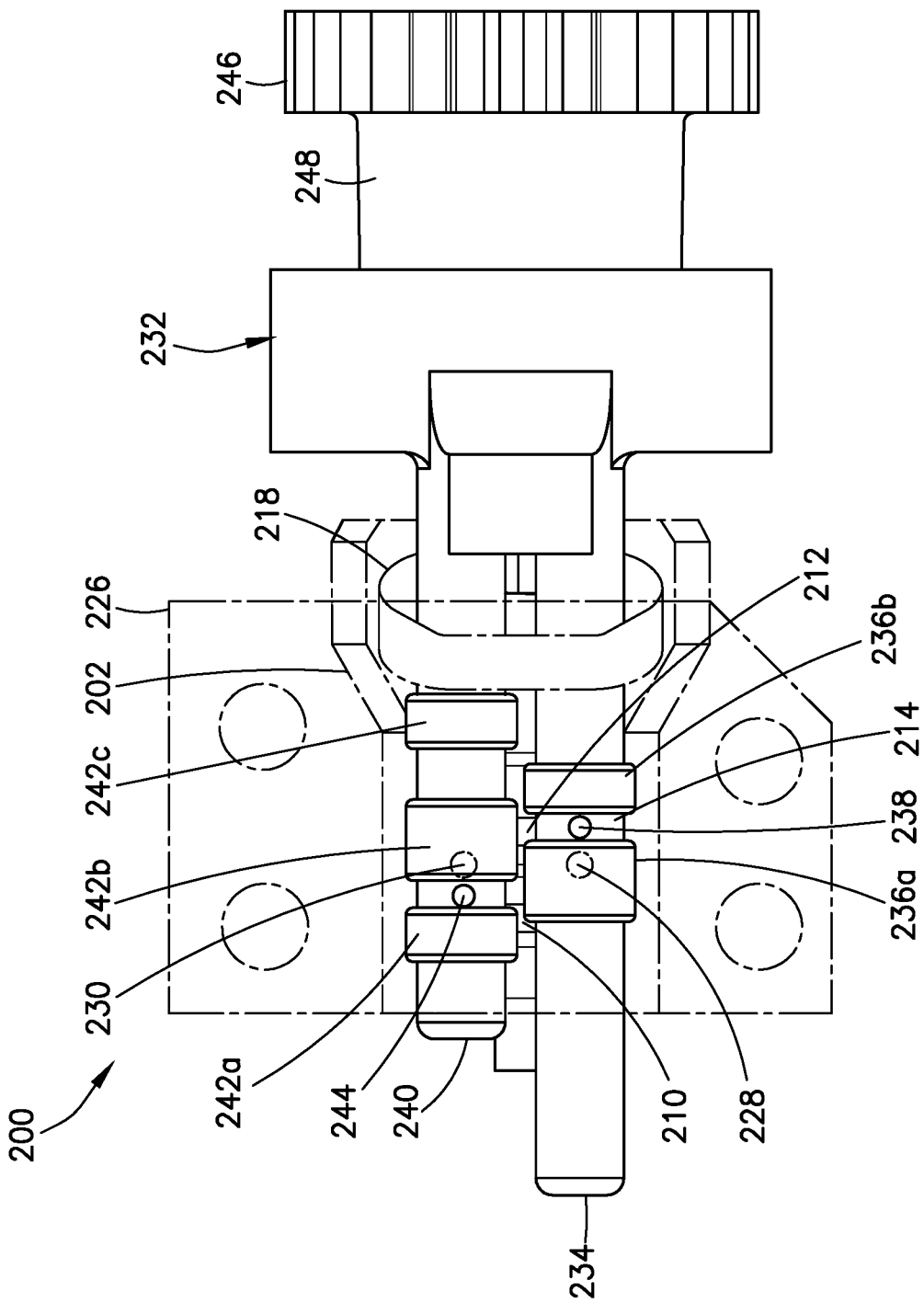
Figure 18:
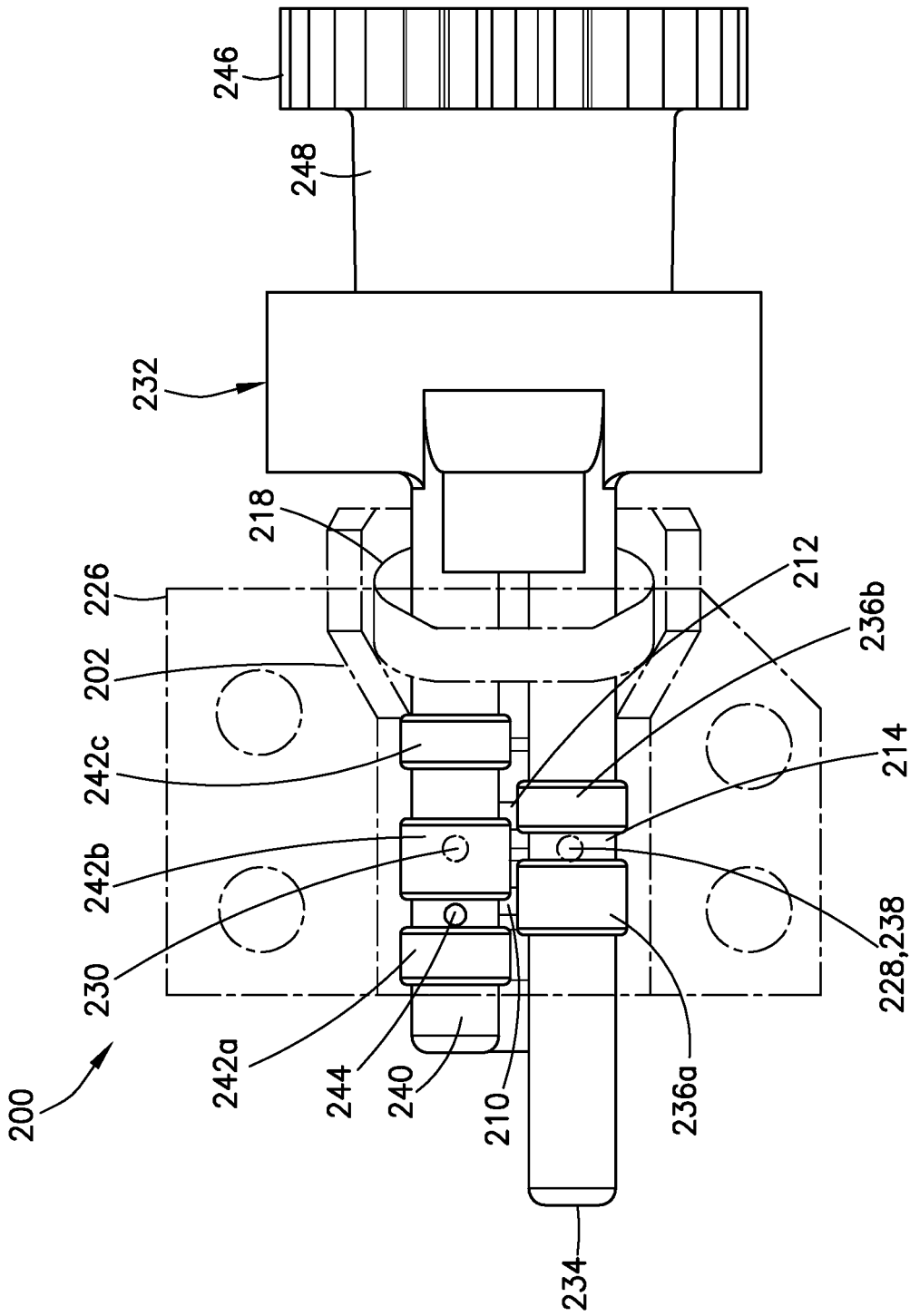

As shown FIGS. 10, 17 and 18, at the end of a discharge stroke, the piston 208 rotates but does not translate due to the cam slot 218 features, but the valve assembly begins to translate relative to the output gear shaft 248 and extend the valve shafts 234,240 out of the bore holes 222a and 222b of the housing 202. The seal 242b covers the fluid discharge port 230, but the fluid intake port 228 is no longer covered by the valve shaft seal 236a, thereby exposing fluid intake port 228 to the opening 224 in the housing and the throughway 238 to allow fluid from a fluid source (e.g., reservoir) to enter the fluid chamber 214 when the piston 208 is extended.

Figure 11:
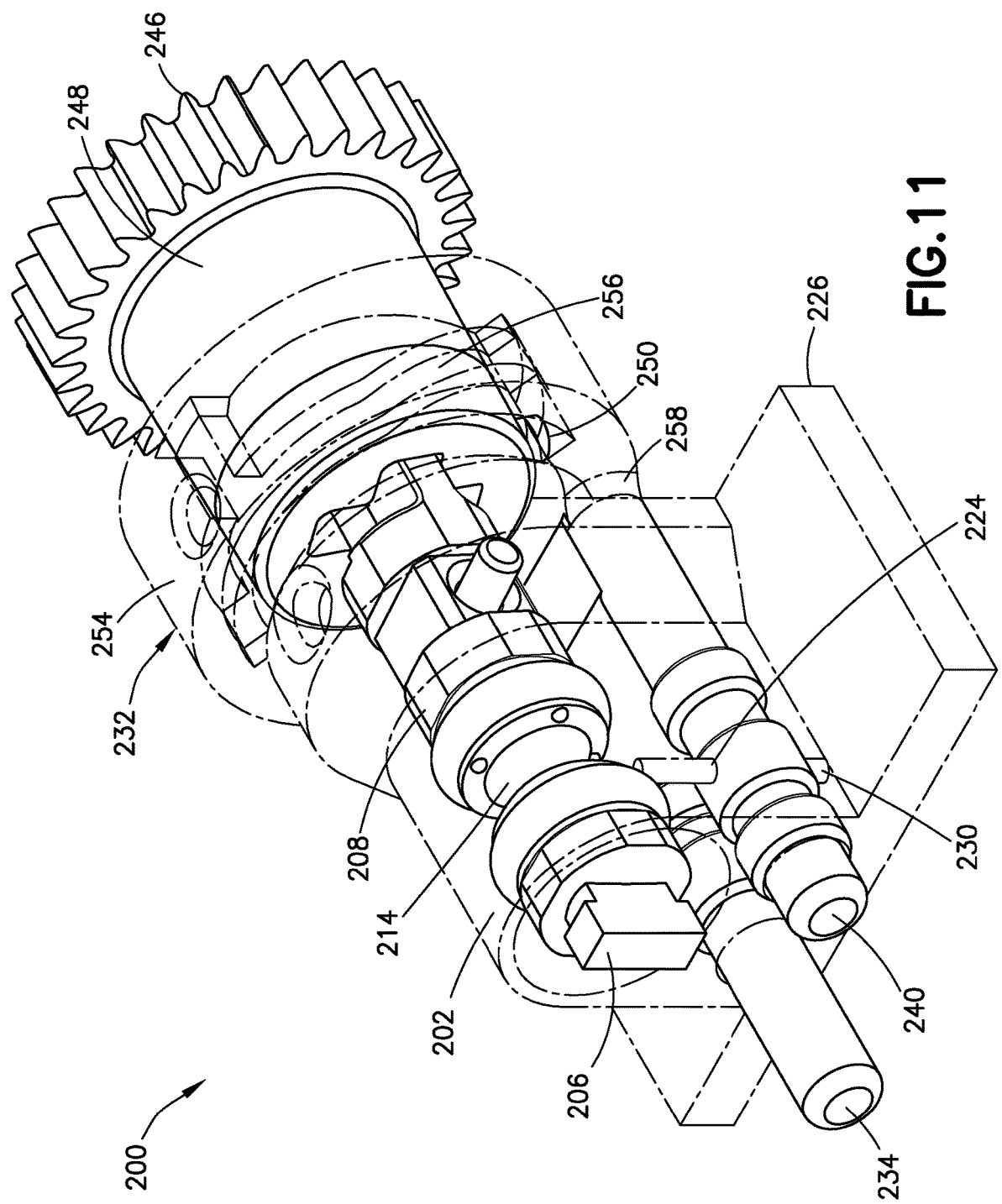
Figure 12:
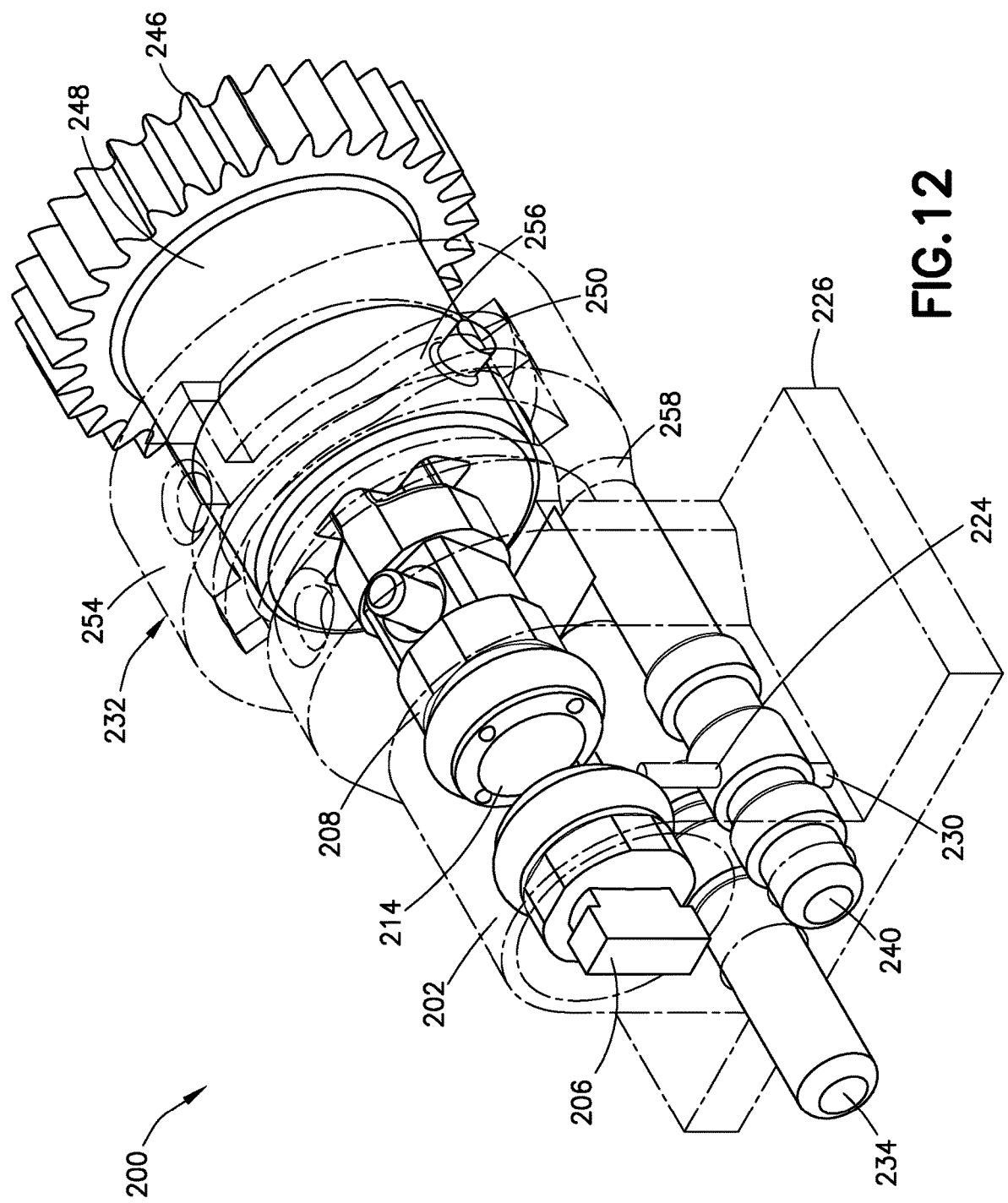
Figure 13:
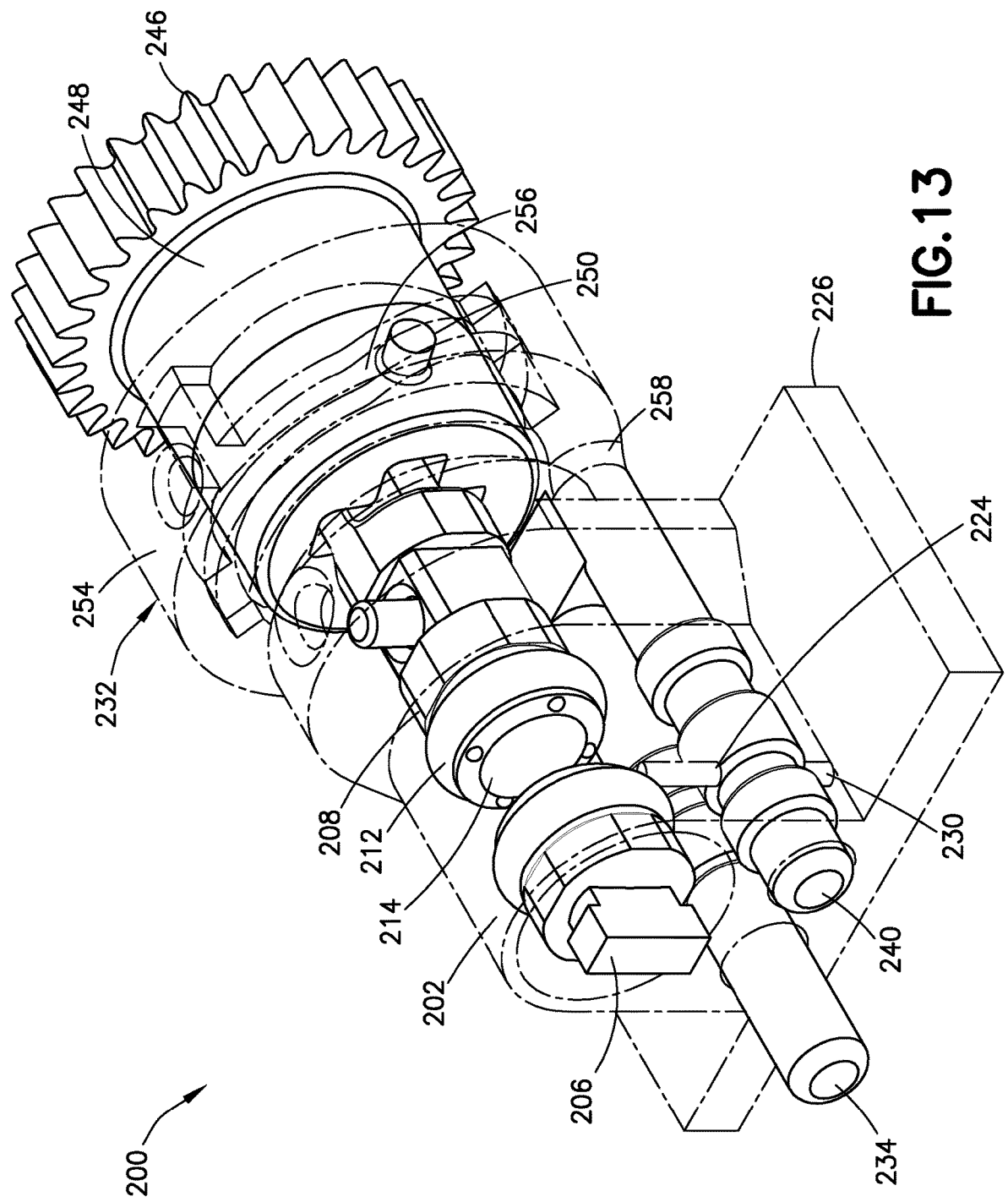
Figure 14:
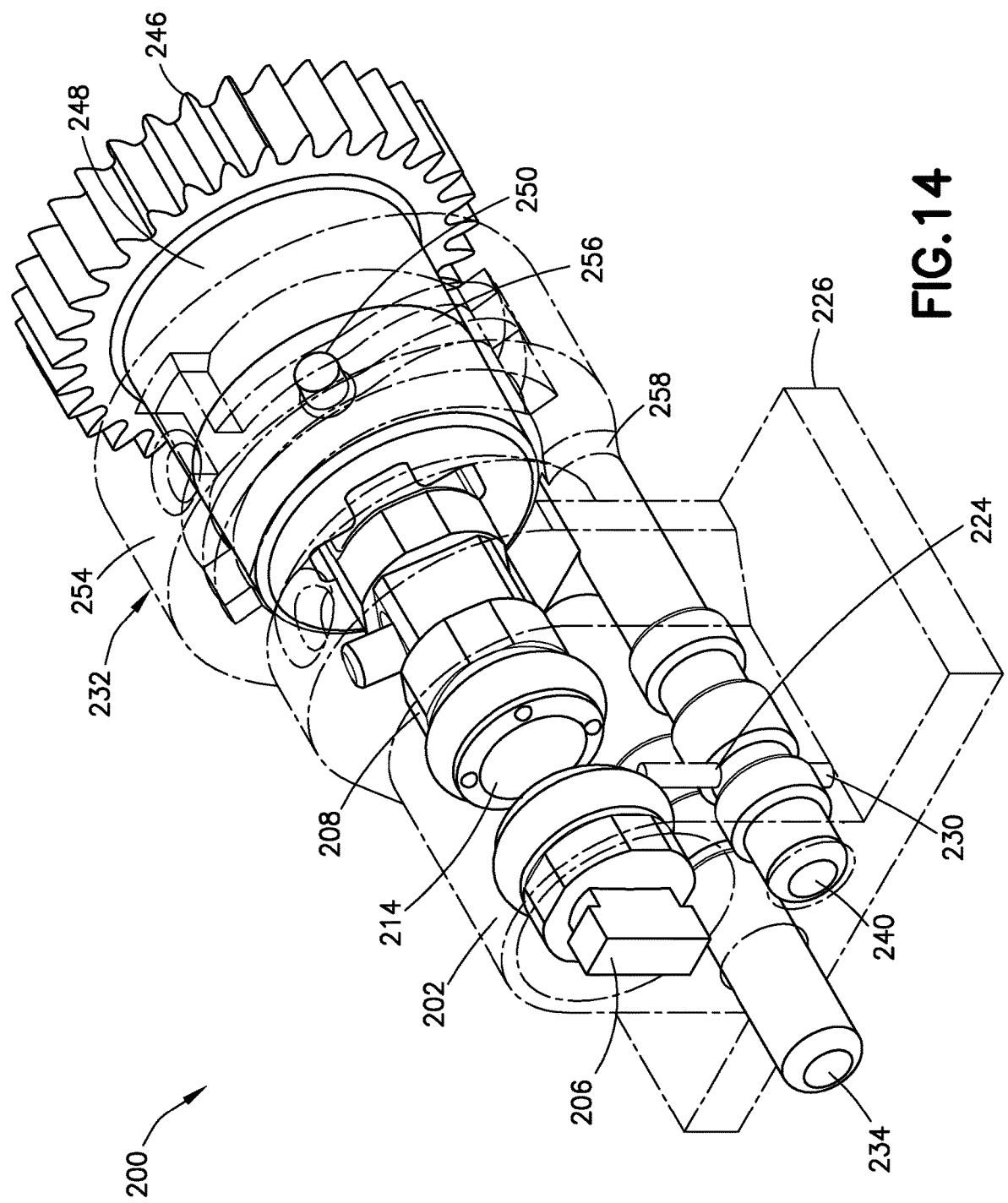
Figure 19:
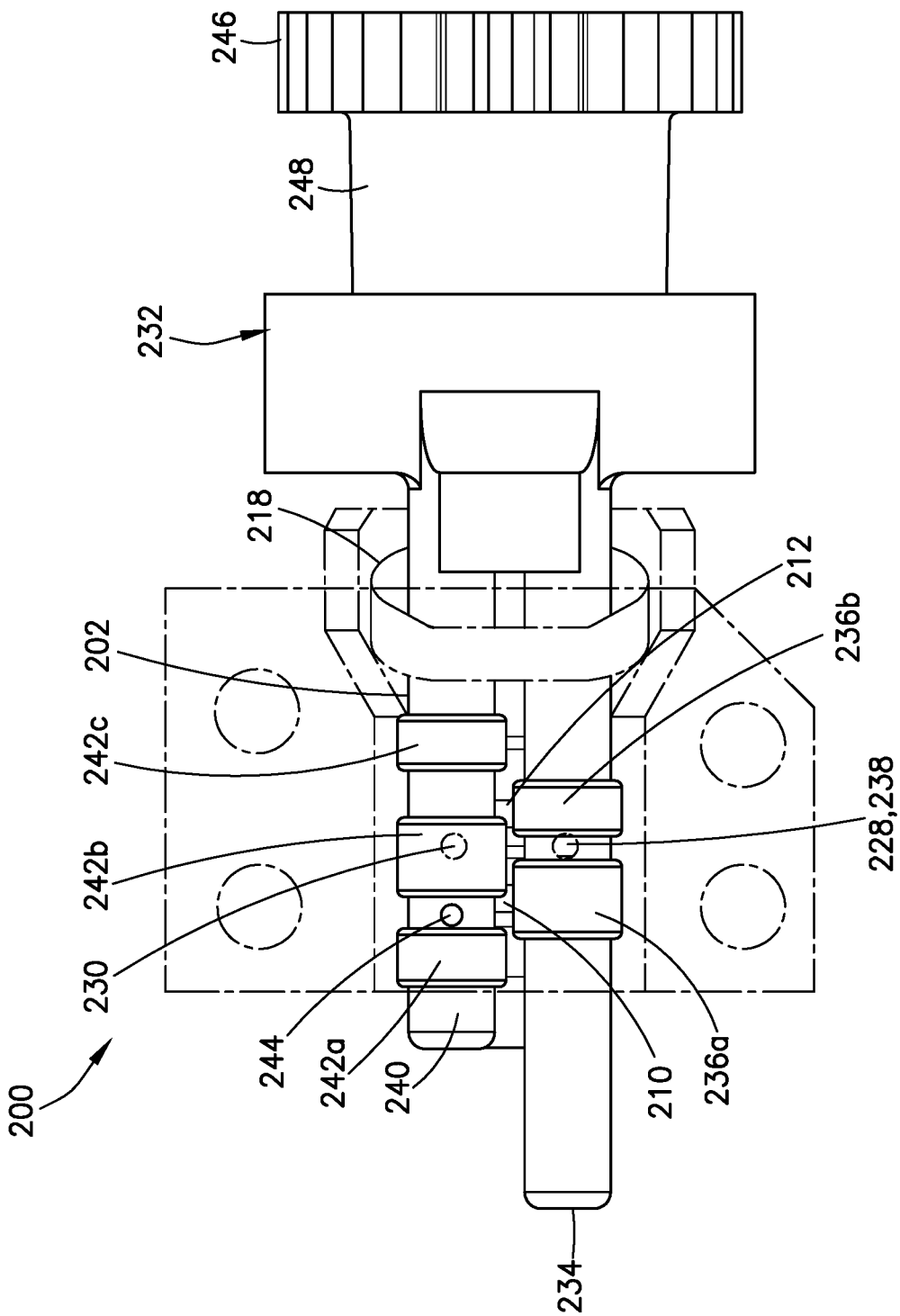
Figure 20:
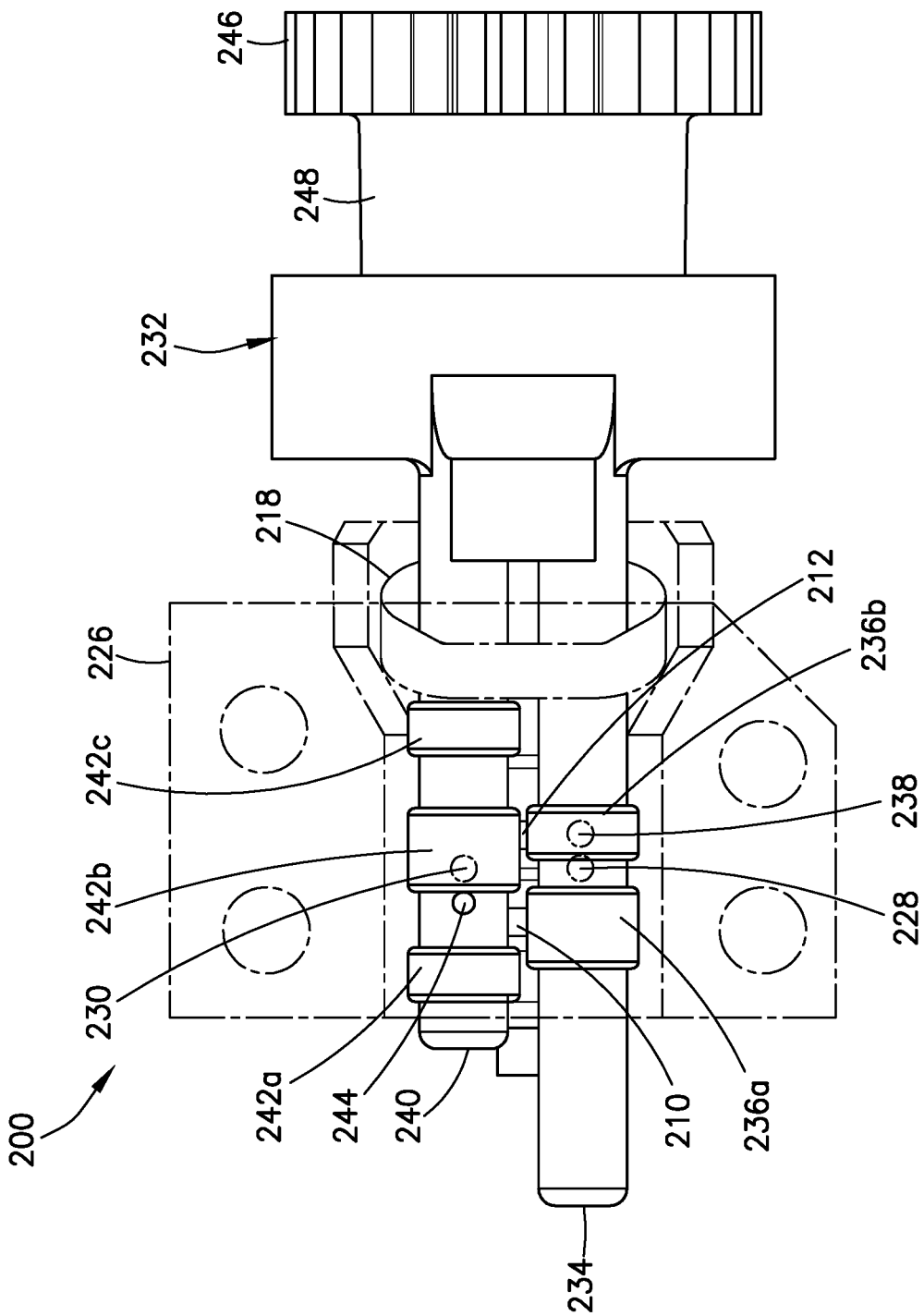
Figure 21:
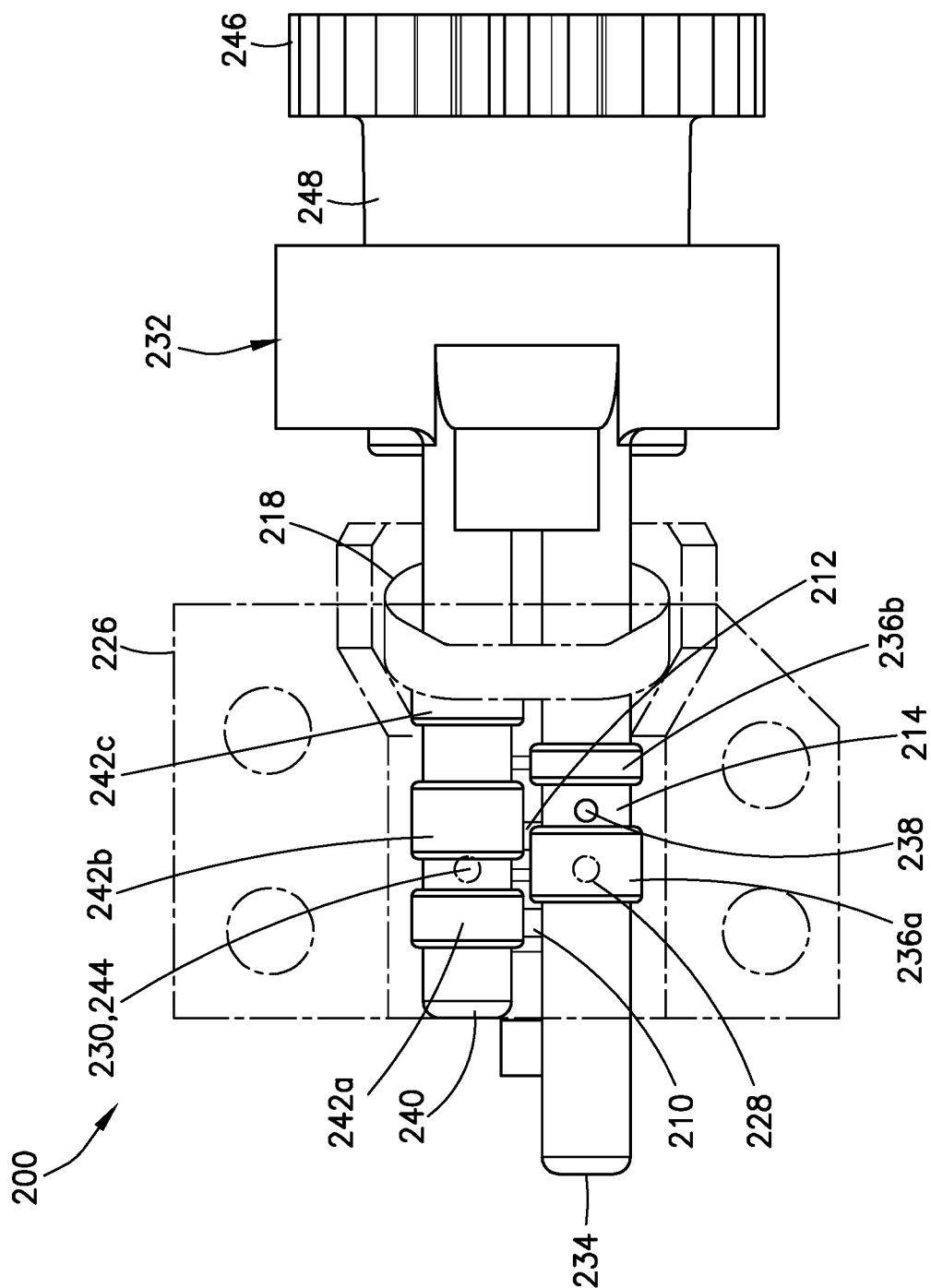

As shown in FIGS. 11, 12 and 19, the second interlock mechanism comprising the output gear pin 250 and shuttle grove is configured to maintain the valve shafts 234,240 and the shuttle 254 stationary relative to the longitudinal axis of the housing 202 and output gear shaft 248 while the piston 208 is translated away from the plug 206 to extend the fluid chamber 214. This piston 208 translation draws fluid into the fluid chamber 214.

Figure 15:
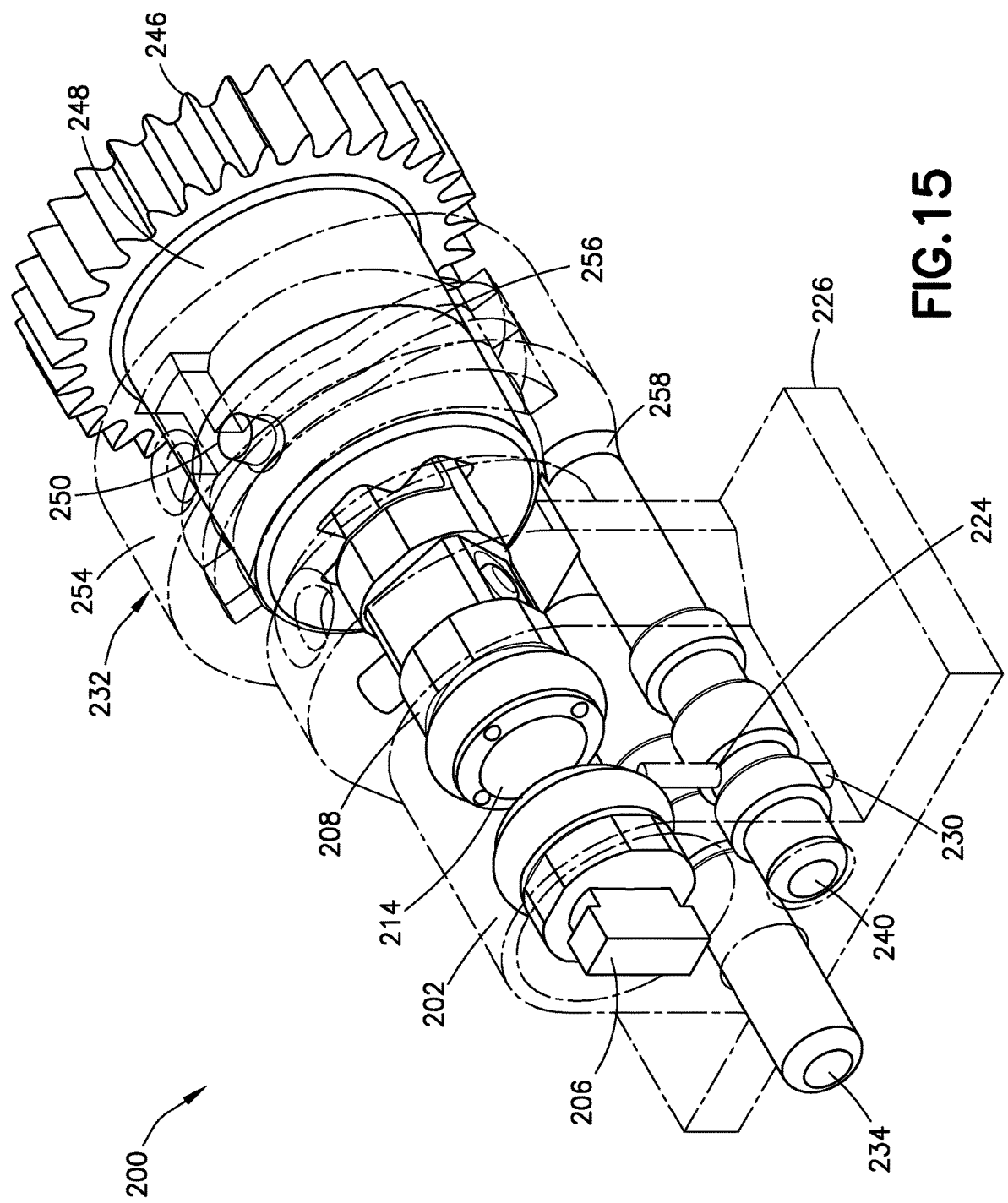

As shown FIGS. 13, 14, 20 and 21, at the end of an intake stroke, the piston 208 rotates but does not translate due to the cam slot 218 features, but the valve assembly begins to translate relative to the output gear shaft 248 and retract the valve shafts 234,240 back into the bore holes 222a and 222b of the housing 202. The seal 236a covers the fluid intake port 228, but the fluid discharge port 230 is no longer covered by the valve shaft seal 242b, thereby exposing fluid discharge port 230 to the opening 224 in the housing and the throughway 244 to allow fluid from the fluid chamber 214 to be discharged toward the patent via the fluid discharge port 230 when the piston 208 is translated toward the plug 206. FIG. 15 illustrates the piston 208 translating toward the plug 206 for another discharge stroke, while the valve shafts remain retracted.

The example pump sub-system 200 arrangement illustrated in FIGS. 2-21 allows the pump to be driven either with a reversing motion at the end of each stroke or to have the output gear run in the same direction without the need for reversing arrangements. In alternative example embodiments, it is also be possible to drive the pump sub-system 200 with a linear actuator and still rely on cam/slot action that would be properly oriented to selectively expose the pump chamber 214 to the ports 228, 230 using the valve assembly 232. Similarly the valve throughways 238, 244 and second interlock mechanism 248,256 can be configured to employ a single valve shaft. Also, the valve shaft(s) can be split into sub-components to aid assembly and installed stiffness.

The example pump sub-system 200 arrangement realizes several improvements over existing pump systems. For example, the pump sub-system 200 obviates large surface contact of fluid with any elastomer that could negatively interact with the drug payload, and obviates pump components that may cause certain insulin destabilization. The pump sub-system 200 employs mechanically coordinated movement of pumping and valving motions which simplifies pump design with reduced part count and obviates need for interlock or other means by which to detect range of motion. In addition, the pump sub-system 200 obviates the need for a seal to connect it to the rest of the patch pump 100. The pump sub-system 200 has a smaller pump volume than many conventional fluid delivery devices, and can employ simplified electronics in the case of single direction of rotation by the pump actuator 134.

The pump sub-system 200 is advantageous because its pump height is significantly reduced (e.g., as compared to the metering subsystems described in WO 2015/157174, which use a manifold with valves apart from a pump housing to direct fluid into and from the reservoir and patient ports, respectively), which allows more space for other components. Further, the pump sub-system 200 obviates need for a manifold seal and sleeve interface and therefore minimizes any likelihood of insulin degradation for fast-acting, less stable insulins, which enables the pump sub-system 200 to be suitable for use with many types of insulin.

The pump sub-system 200 is also advantageous because it allows sufficiently small dose volumes to be delivered, thereby enabling its use as a Type 1 Diabetes pump as well as a solution for other drug therapies. The pump sub-system 200 also has the ability to deliver fractional doses if a sensor is located on the output gear or driver in piston cam slot.

In accordance with another advantage, reduced fluid chamber 214 volume can reduce insulin degradation by increasing pumping frequency. In accordance with an illustrative embodiment, size reduction can be implemented in the pump sub-system 130 described in commonly-owned WO 2015/157174 or pump sub-system 200 described above by taking advantage of a squared power effect of diameter on dose volume in an attempt to keep tolerance to dimension ratio in a controlled range that leads to high product capability. Such size reduction achieves the main advantages of dose volume reduction and the ability to pump more frequently, but without the need to change the overall mating and assembly components as well as software architecture of the patch pump 100.

For example, a carefully sized pump chamber and piston to reduce the dose volume without compromising tolerance stacks and therefore allowing more frequent pumping (e.g., by the factor the volume delivery is reduced by) has been observed to improve insulin stability. In one example implementation, a patch pump sub-system 130 (e.g., as described in commonly-owned WO 20151157174) was designed to reduce piston travel by a factor of 37% and the sleeve diameter by a factor of 27% (e.g., diameter is squared and so has a greater impact on pump volume reduction), for a total dose volume of 1.50 micro-liter and overall reduction in dose of 29%. Tolerances on each dimension have been highly capable and, with this change, the ratio of tolerance (e.g., assumed unchanged due to molding limitations) to dimension is still favorable and allows a working design. Because of the reduction in dose volume, this modified pump sub-system 130 can also be used for other therapies beyond insulin delivery. The dose volume reduction of 3.4 (1129%) allows pumping 3.4 times more frequently than the non-modified version of the pump sub-system 130 and testing has shown this to be a favorable condition for the more fast-acting and unstable insulins.

This illustrative embodiment realizes a number of advantages. For example, a lower dose volume enables a wider range of therapies, more control over patient therapy, and higher pumping frequency. Higher pumping frequency has been observed to be beneficial for fast-acting, more unstable insulin. In addition, smaller components can be packaged in existing pump housings with minimal changes to mating parts in the pump sub-system 130, 200 and to related assembly equipment.

Figure 22:
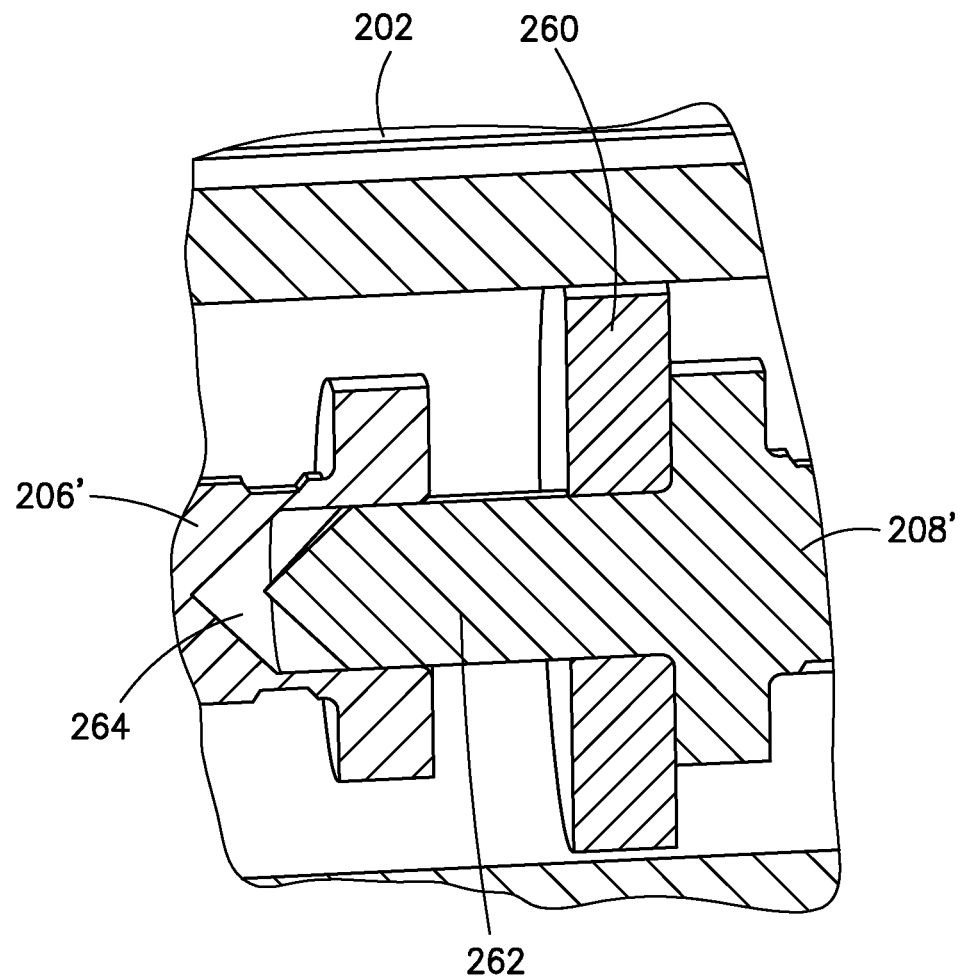
FIG. 22 is a partial side view of a pump sub-system in accordance with an illustrative embodiment.

In accordance with another illustrated embodiment, an adaptable pump chamber 214 volume is achieved by using washer(s) or shim disk(s) the pump chamber to reduce the delivered volume and allow for more frequent pumping or smaller individual doses without the need to fully change molded components in the pump sub-system 130 or 200. This is achieved by adding properly sized disk(s) 260 (e.g., with selected thickness) in the pump chamber 214 during assembly. A single disk. 260 as illustrated in FIG. 22 or multiple disks can be used. When the pump sub-system 130, 200 retracts, the pump chamber 214 fills by a volume equal to that volume amount not taken up by the disks (i.e., each disk 260 takes its volume away from the plain open pump chamber). When the piston moves forward, the advance delivery travel is limited by the disk and then valving occurs to reverse motion. A pump cycle is therefore successfully completed. The proximal end of the piston 208 can be configured to extend beyond the seal 212 sufficiently to receive a disk 260. In an alternative embodiment, for better positional control, the disks 260 can be washers and the piston 208' can be a molded part modified to have a boss 262 to support the washer 260. An equal recess 264 can be provided in a suitably modified plug 206' part. This technical solution addresses the needs of improving compatibility with fast-acting, less stable insulin by allowing more frequent pumping due to lower individual dose volume deliveries. Alternatively, for stable insulin, this technical solution can be used to deliver smaller volumes to achieve better therapeutic control. For example, this technical solution can also be used to pump other drugs that require smaller doses and are compatible with the pump materials and mechanism.

This illustrative embodiment realizes a number of advantages. For example, this simple modification of the addition of a disk or shim to a pump chamber can enable compatibility of previous pump sub-system designs with fast-acting, less stable insulin without changing any molded parts. Instead, all that is required is the addition of one component and a slight adjustment on the assembly line. The pump is then configured to pump more frequently, thereby reducing any potential for latent insulin degradation while also allowing for smaller doses of stable insulin or other drugs to be pumped.

It will be understood by one skilled in the art that this disclosure is not limited in its application to the details of construction and the arrangement of components set forth in the above description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the illustrative embodiments can be easily construed as within the scope of claims exemplified by the illustrative embodiments by programmers skilled in the art to which the illustrative embodiments pertain. Method steps associated with the illustrative embodiments can be performed by one or more programmable processors executing a computer program, code or instructions to perform functions (e.g., by operating on input data and/or generating an output). Method steps can also be performed by, and apparatus of the illustrative embodiments can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of claims exemplified by the illustrative embodiments. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. In other words, the processor and the storage medium may reside in an integrated circuit or be implemented as discrete components.

Computer-readable non-transitory media includes all types of computer readable media, including magnetic storage media, optical storage media, flash media and solid state storage media. It should be understood that software can be installed in and sold with a central processing unit (CPU) device. Alternatively, the software can be obtained and loaded into the CPU device, including obtaining the software through physical medium or distribution system, including, for example, from a server owned by the software creator or from a server not owned but used by the software creator. The software can be stored on a server for distribution over the Internet, for example.

The above-presented description and figures are intended by way of example only and are not intended to limit the illustrative embodiments in any way except as set forth in the following claims. It is particularly noted that persons skilled in the art can readily combine the various technical aspects of the various elements of the various illustrative embodiments that have been described above in numerous other ways, all of which are considered to be within the scope of the claims.

The invention claimed is:

1. A pump device for fluid delivery comprising:
   a housing,
   a pump having a variable volume fluid chamber disposed within the housing and configured with a first end of the pump that can be translated relative to a second end of the pump to vary a length of the fluid chamber along a longitudinal axis of the housing during pumping motion;
   a fluid intake port that is in fluid communication with a fluid supply for the fluid chamber;

a fluid discharge port that is in fluid communication with a fluid path that receives fluid from the fluid chamber and directs the fluid to a fluid output;

a valve assembly movable relative to the fluid intake port and the fluid discharge port, the valve assembly comprising at least one valve shaft comprising a first throughway and a second throughway;

the housing having an opening from the fluid chamber to the valve assembly, and the valve assembly configured for valving motion comprising being controllably translated and disposed between the opening and the fluid intake port to provide fluid communication therebetween via the first throughway for fluid intake into the fluid chamber, and between the opening and the fluid discharge port to provide fluid communication therebetween via the second throughway for fluid discharge from the fluid chamber;

wherein the translation of the first end of the pump and the translation of the valve assembly are controlled to coordinate the valving motion of the valve assembly with the pumping motion of the pump; and the housing and the pump have a first interlock mechanism that employs cam action to translate the first end of the pump relative to the second end when rotated by a drive mechanism; and the valve assembly has a second interlock mechanism that employs cam action to translate the valve assembly with respect to rotation of the drive mechanism.

2. The pump device of claim 1, wherein the pump further comprises a plug and a piston disposed in the housing, a distal end of the plug and a proximal end of the piston respectively forming the second end and the first end of the pump, the proximal end of the piston being connected to the drive mechanism.

3. The pump device of claim 2, wherein the first interlock mechanism comprises an arcuate cam slot in one of the housing and the piston, and a pin on the other one of the housing and the piston that is configured to engage with the cam slot; and wherein, when the piston is rotated, the cam slot is configured to control a distance by which the proximal end of the piston translates relative to the distal end of the plug and direction along the longitudinal axis for fluid intake and fluid discharge operations.

4. The pump device of claim 2, wherein the plug and the piston are each provided with a seal for respective ones of the first end and the second end of the pump to prevent leakage except when fluid is received in the fluid chamber via the opening in the housing and when fluid is discharged from the fluid chamber via the opening in the housing.

5. The pump device of claim 2, wherein a pump member chosen from the plug and the piston is configured to have a shim coupled thereto to reduce volume of the fluid chamber.

6. The pump device of claim 2, wherein volume of the fluid chamber is reduced using at least one modification of the pump device selected from a reduction in diameter of the fluid chamber, and a reduction in a travel distance of the piston to vary the volume of the fluid chamber.

7. The pump device of claim 2, wherein volume of the fluid chamber is reduced by providing a boss on one of the piston and the plug, and a corresponding recess on the other one of the piston and the plug.

8. The pump device of claim 1, wherein the valve assembly comprises a first valve shaft comprising the first throughway and a second valve shaft comprising the second throughway, the first valve shaft and the second valve shaft each being selectively translated along the longitudinal axis of the housing to align the opening of the housing, the first throughway of the first valve shaft, and the fluid intake port, and to seal the second throughway of the second valve shaft, during a fluid intake operation of the pump device, and to align the opening of the housing, the second throughway of the second valve shaft, and the fluid discharge port, and to seal the first throughway of the first valve shaft, during a fluid discharge operation of the pump device.

9. The pump device of claim 1, wherein the valve assembly further comprises seals disposed along the at least one valve shaft on respective sides of the first throughway and the second throughway.

10. The pump device of claim 9, wherein the at least one valve shaft is selectively translated along the longitudinal axis of the housing to align the opening of the housing, the first throughway of the at least one valve shaft, and the fluid intake port, and to seal the second throughway of the at least one valve shaft, during a fluid intake operation of the fluid delivery pump device, and to align the opening of the housing, the second throughway of the at least one valve shaft, and the fluid discharge port, and to seal the first throughway of the at least one valve shaft, during a fluid discharge operation of the fluid delivery pump device.

11. The pump device of claim 8, wherein the second interlock mechanism is disposed between the valve assembly and the drive mechanism and comprises an arcuate cam slot in one of the valve assembly and the drive mechanism, and a pin on the other one of the valve assembly and the drive mechanism that is configured to engage with the cam slot; and wherein, when the drive mechanism rotates, the cam slot is configured to control a distance by which the valve assembly translates along the longitudinal axis for fluid intake and fluid discharge operations.

* * * * *